US012445703B2

(12) United States Patent
Dreiocker et al.

(10) Patent No.: US 12,445,703 B2
(45) Date of Patent: Oct. 14, 2025

(54) VEHICULAR CAMERA MODULE

(71) Applicant: Magna Electronics Inc., Auburn Hills, MI (US)

(72) Inventors: Rene Dreiocker, Rochester Hills, MI (US); Steven V. Byrne, Goodrich, MI (US); Jonathan D. Conger, Huntington Woods, MI (US); Garret F. Achenbach, Rochester Hills, MI (US); Andreas Weis, Gedern (DE)

(73) Assignee: Magna Electronics Inc., Auburn Hills, MI (US)

( * ) Notice: Subject to any disclaimer, the term of this patent is extended or adjusted under 35 U.S.C. 154(b) by 359 days.

(21) Appl. No.: 18/162,767

(22) Filed: Feb. 1, 2023

(65) Prior Publication Data

US 2023/0247275 A1 Aug. 3, 2023

Related U.S. Application Data

(60) Provisional application No. 63/267,443, filed on Feb. 2, 2022.

(51) Int. Cl.
*H04N 23/55* (2023.01)
*H04N 23/51* (2023.01)
*H04N 23/54* (2023.01)
*H04N 23/57* (2023.01)

(52) U.S. Cl.
CPC ............. *H04N 23/55* (2023.01); *H04N 23/51* (2023.01); *H04N 23/54* (2023.01); *H04N 23/57* (2023.01)

(58) Field of Classification Search
CPC ........ H04N 23/51; H04N 23/54; H04N 23/55; H04N 23/57; H04N 23/52

USPC ......................................................... 348/148
See application file for complete search history.

(56) References Cited

U.S. PATENT DOCUMENTS

| 5,550,677 | A | 8/1996 | Schofield et al. |
|---|---|---|---|
| 5,670,935 | A | 9/1997 | Schofield et al. |
| 5,949,331 | A | 9/1999 | Schofield et al. |
| 6,690,268 | B2 | 2/2004 | Schofield et al. |
| 6,824,281 | B2 | 11/2004 | Schofield et al. |
| 7,038,577 | B2 | 5/2006 | Pawlicki et al. |
| 7,480,149 | B2 | 1/2009 | DeWard et al. |
| 7,720,580 | B2 | 5/2010 | Higgins-Luthman |
| 7,855,755 | B2 | 12/2010 | Weller et al. |
| 7,965,336 | B2 | 6/2011 | Bingle et al. |

(Continued)

*Primary Examiner* — William C Vaughn, Jr.
*Assistant Examiner* — Astewaye Gettu Zewede
(74) *Attorney, Agent, or Firm* — HONIGMAN LLP

(57) ABSTRACT

A vehicular camera module includes a camera housing having a front housing portion and a rear housing portion, a lens barrel accommodating a lens, and an imager printed circuit board (PCB). The lens barrel is attached at the front housing portion and extends through an aperture of the front housing portion. With an imager aligned with the lens, the imager PCB is adhesively attached at an inner end of the lens barrel. With the lens barrel and a connector PCB attached at the front housing portion, the connector PCB is spaced from the imager printed circuit board. Circuitry of the imager PCB is electrically connected to circuitry of the connector PCB via a flexible electrical connector. The rear housing portion includes a receiving portion configured to receive the electrical connector when the front housing portion is attached at the rear housing portion during assembly of the vehicular camera module.

22 Claims, 25 Drawing Sheets

(56) References Cited

U.S. PATENT DOCUMENTS

| | | |
|---|---|---|
| 8,256,821 B2 | 9/2012 | Lawlor et al. |
| 8,542,451 B2 | 9/2013 | Lu et al. |
| 8,994,878 B2 | 3/2015 | Byrne et al. |
| 9,077,098 B2 | 7/2015 | Latunski |
| 9,233,641 B2 | 1/2016 | Sesti et al. |
| 9,277,104 B2 | 3/2016 | Sesti et al. |
| 9,451,138 B2 | 9/2016 | Winden et al. |
| 9,487,159 B2 | 11/2016 | Achenbach |
| 9,565,342 B2 | 2/2017 | Sauer et al. |
| 9,596,387 B2 | 3/2017 | Achenbach et al. |
| 9,621,769 B2 | 4/2017 | Mai et al. |
| 9,871,971 B2 | 1/2018 | Wang et al. |
| 9,878,669 B2 | 1/2018 | Kendall |
| 9,896,039 B2 | 2/2018 | Achenbach et al. |
| 10,142,532 B2 | 11/2018 | Mleczko |
| 10,230,875 B2 | 3/2019 | Mleczko et al. |
| 10,250,004 B2 | 4/2019 | Conger et al. |
| 10,264,219 B2 | 4/2019 | Mleczko et al. |
| 10,272,857 B2 | 4/2019 | Conger et al. |
| 10,466,563 B2 | 11/2019 | Kendall et al. |
| 10,484,587 B2 | 11/2019 | Conger |
| 2009/0244361 A1 | 10/2009 | Gebauer et al. |
| 2009/0295181 A1 | 12/2009 | Lawlor et al. |
| 2013/0242099 A1 | 9/2013 | Sauer et al. |
| 2014/0160284 A1 | 6/2014 | Achenbach et al. |
| 2014/0226012 A1 | 8/2014 | Achenbach |
| 2014/0373345 A1 | 12/2014 | Steigerwald |
| 2015/0015713 A1 | 1/2015 | Wang et al. |
| 2015/0124098 A1 | 5/2015 | Winden et al. |
| 2015/0222795 A1 | 8/2015 | Sauer et al. |
| 2015/0266430 A1 | 9/2015 | Mleczko et al. |
| 2015/0327398 A1 | 11/2015 | Achenbach et al. |
| 2015/0365569 A1 | 12/2015 | Mai et al. |
| 2016/0037028 A1 | 2/2016 | Biemer |
| 2016/0243987 A1 | 8/2016 | Kendall |
| 2016/0268716 A1 | 9/2016 | Conger et al. |
| 2016/0286103 A1 | 9/2016 | Van Dan Elzen |
| 2017/0129419 A1 | 5/2017 | Conger et al. |
| 2017/0133811 A1 | 5/2017 | Conger et al. |
| 2017/0201661 A1 | 7/2017 | Conger |
| 2017/0280034 A1 | 9/2017 | Hess et al. |
| 2017/0295306 A1 | 10/2017 | Mleczko |
| 2017/0302829 A1 | 10/2017 | Mleczko et al. |
| 2018/0072239 A1 | 3/2018 | Wienecke et al. |
| 2018/0098033 A1 | 4/2018 | Mleczko et al. |
| 2019/0121051 A1 | 4/2019 | Byrne et al. |
| 2019/0124238 A1 | 4/2019 | Byrne et al. |
| 2019/0124243 A1 | 4/2019 | Mleczko et al. |
| 2019/0248311 A1* | 8/2019 | Conger .................. B60R 16/03 |
| 2019/0306966 A1 | 10/2019 | Byrne et al. |
| 2019/0386413 A1* | 12/2019 | Conger .................. H01R 27/02 |
| 2020/0001787 A1 | 1/2020 | Lu et al. |
| 2020/0010024 A1 | 1/2020 | Sesti et al. |
| 2020/0033549 A1 | 1/2020 | Liu et al. |
| 2020/0039447 A1 | 2/2020 | Winden |
| 2020/0137926 A1 | 4/2020 | Wohlte |
| 2020/0154020 A1 | 5/2020 | Byrne et al. |
| 2020/0314311 A1* | 10/2020 | Liu ....................... B60R 11/04 |
| 2020/0412925 A1 | 12/2020 | Byrne et al. |
| 2021/0041768 A1* | 2/2021 | Sesti ..................... G03B 17/12 |
| 2021/0057835 A1* | 2/2021 | Peng ...................... H05K 3/32 |
| 2021/0368082 A1* | 11/2021 | Solar ..................... H04N 23/51 |
| 2022/0089102 A1 | 3/2022 | Sauer et al. |
| 2022/0291572 A1* | 9/2022 | Oba ...................... H04N 23/51 |
| 2023/0016936 A1 | 1/2023 | Conger |

* cited by examiner

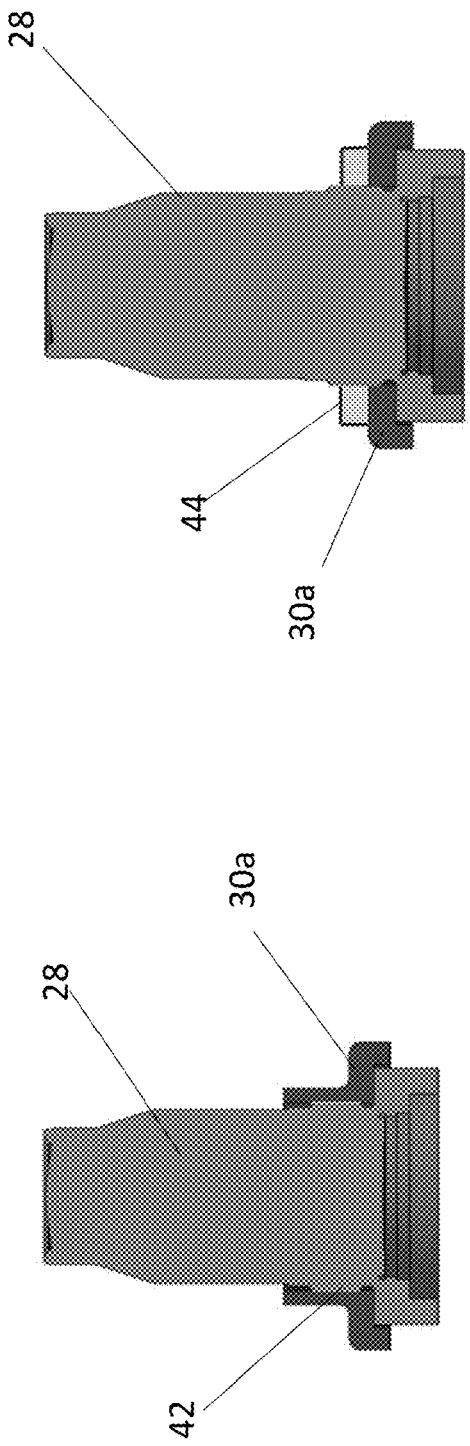
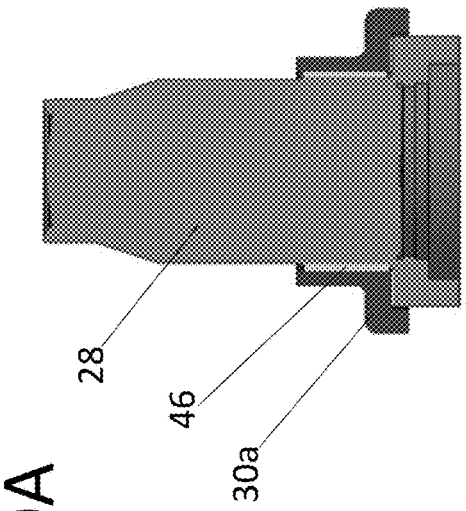
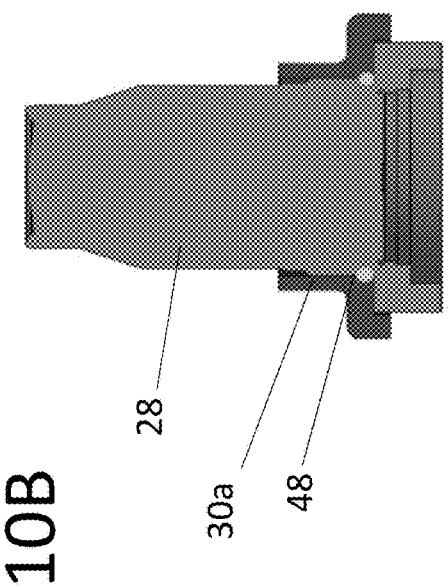
FIG. 10A
FIG. 10B
FIG. 10C
FIG. 10D

VEHICULAR CAMERA MODULE

CROSS REFERENCE TO RELATED APPLICATION

The present application claims the filing benefits of U.S. provisional application Ser. No. 63/267,443, filed Feb. 2, 2022, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A driving assistance system or vision system or imaging system for a vehicle utilizes one or more cameras to capture image data representative of images exterior of the vehicle. The camera includes a lens holder and an imager printed circuit board (imager PCB), with the imager PCB fixed to the lens holder.

A vehicular camera module is configured to be disposed at the vehicle to view exterior (or interior) of the vehicle. The camera module includes a housing including a front portion and a rear portion. A lens barrel accommodates a lens and extends through the front portion of the housing. An imager printed circuit board (imager PCB) is operably coupled to the lens barrel via an adhesive, and an image sensor is operably coupled to the imager PCB proximate the lens barrel. A thermal media or thermally conductive element may be proximate the imager PCB and in thermal conductive contact with the rear portion of the housing. A connector printed circuit board (connector PCB) is electrically connected to the imager PCB.

The vision system or imaging system for a vehicle may utilize one or more cameras (preferably one or more CMOS cameras) to capture image data representative of images exterior of the vehicle, and provides the communication/data signals, including camera data or captured image data, that may be displayed at a display screen that is viewable by the driver of the vehicle, such as when the driver is backing up the vehicle, and that may be processed and, responsive to such image processing, the system may detect an object at or near the vehicle and in the path of travel of the vehicle, such as when the vehicle is backing up. The vision system may be operable to display a surround view or bird's eye view of the environment at or around or at least partially surrounding the subject or equipped vehicle, and the displayed image may include a displayed image representation of the subject vehicle.

These and other objects, advantages, purposes and features of the present invention will become apparent upon review of the following specification in conjunction with the drawings.

BRIEF DESCRIPTION OF THE DRAWINGS

FIG. 10A is a cross-sectional view of a camera module with a lens barrel threadably coupled to a housing and with a thread locker adhesive;

FIG. 10B is a cross-sectional view of a camera module with a lens barrel threadably coupled to a housing via a thread locknut;

FIG. 10C is a cross-sectional view of a camera module operably coupled to a housing via an adhesive;

FIG. 10D is a cross-sectional view of a camera module with an O-ring positioned between a lens barrel and a housing;

DESCRIPTION OF THE PREFERRED EMBODIMENTS

A vehicle vision system and/or driver or driving assist system and/or object detection system and/or alert system operates to capture image data representative of a scene exterior of the vehicle and may process the captured image data to display images and/or to detect objects at or near the vehicle and in the predicted path of the vehicle, such as to assist a driver of the vehicle in maneuvering the vehicle in a forward or rearward direction. For example, a forward viewing camera disposed at and behind the windshield of the vehicle may capture image data of the scene forward of the vehicle for one or more driving assist systems of the vehicle. Optionally, one or more other cameras may be disposed at the vehicle with exterior fields of view, whereby the image data captured by those cameras may be processed for object detection and/or used to generate video images for viewing by the driver of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
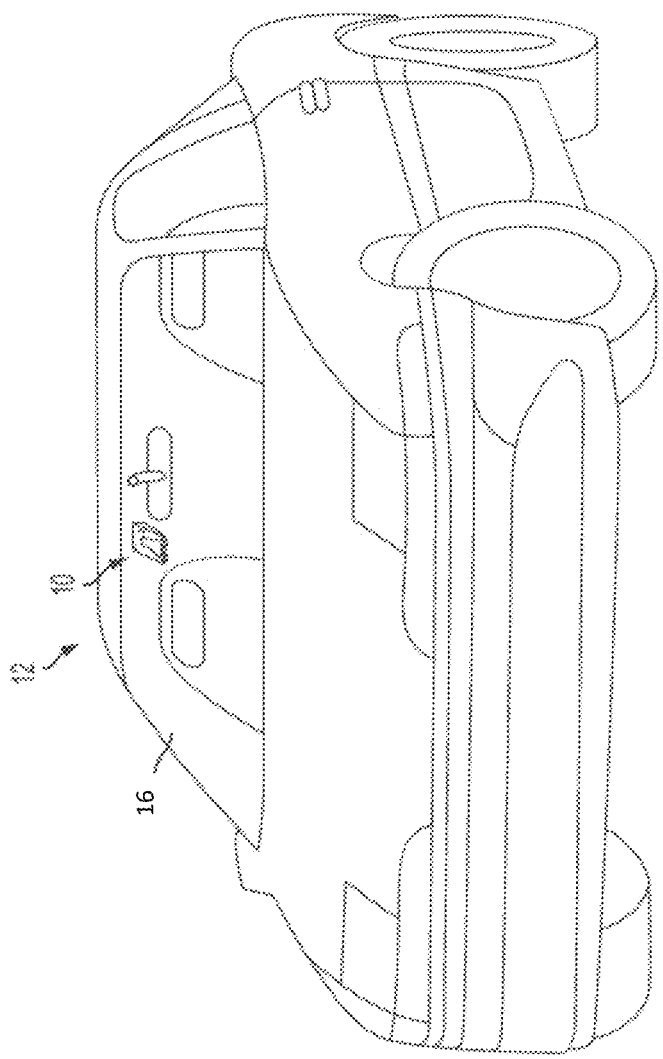
FIG. 1 is a perspective view of a vehicle with a vision system that incorporates a camera module.

Referring now to the drawings and the illustrative embodiments depicted therein, an imaging system or vision system 10 for a vehicle 12 includes at least one exterior viewing imaging sensor or camera or camera module 14, such as a forward viewing camera, which may be disposed at and behind a windshield 16 of the vehicle 12 and viewing forward through the windshield 16 so as to capture image data representative of the scene occurring forward of the vehicle (FIG. 1). Optionally, the system 10 may include multiple exterior viewing imaging sensors or cameras, such as sideward/rearward viewing camera at respective sides of the vehicle 12, and a rearward viewing camera at the rear of the vehicle 12, which capture images exterior of the vehicle 12. The camera 14 or cameras each include a lens for focusing images at or onto an imaging array or imaging plane or imager of the camera 14. The forward viewing camera 14 disposed at the windshield 16 of the vehicle 12 views through the windshield 16 and forward of the vehicle 12, such as for a machine vision system (such as for traffic sign recognition, headlamp control, pedestrian detection, collision avoidance, lane marker detection and/or the like). The vision system 10 includes a controller or electronic control unit (ECU) having electronic circuitry and associated software, with the electronic circuitry including a data processor or image processor that is operable to process image data captured by the camera 14 or cameras 14. The ECU may detect or determine presence of objects or the like and/or may provide the system with displayed images at a display device for viewing by the driver of the vehicle 12. The data transfer or signal communication from the camera 14 to the ECU may comprise any suitable data or communication link, such as a vehicle network bus or the like of the equipped vehicle 12.

High optical performance requirements of autonomous driving cameras requires techniques to prevent focus drift with aging, environmental exposure, and transient temperature changes. The shape of the camera must be adapted to new requirements. Mounting locations vary, which drives unique geometries. For example, in the windshield area of a vehicle, the mounting space allotted is generally about 30 mm×50 mm. Also, connector access is important, and the camera should not require separate sealing. The camera may be shaped to clear shallower rake angles in future vehicles which are optimized for aerodynamics. A space of about 24 mm×24 mm to about 27 mm×27 mm is allotted in a windshield area plus in other areas of the vehicle including mirrors, A/B/C pillar, fascia, roof, etc., so a reduced camera depth is important.

Typically, active focus and alignment is used to set and secure a focal position of a lens to an imager component. However, this leads to expensive and complicated measures to manage the compliance tolerances created by camera components and manufacturing focus/alignment processes. For example, a camera may be assembled using an active PCB alignment, which may use screws to secure the PCB to the lens holder or front camera housing. After the PCB is secured to the lens holder, the lens barrel (such as a threaded lens barrel) is threaded into the lens holder and used to set the focus of the lens relative to the imager. After the lens and imager are optically aligned and focused (via threading the lens barrel into the lens holder), the lens barrel (and lens) is secured to the lens holder with adhesive on the lens threads.

Optionally, active lens alignment may be provided where the imager PCB is secured to the housing using screws and the lens is actively moved to set focus and alignment, whereby a quick cure adhesive is used to set the focus and alignment of the lens relative to the imager. The adhesive acts as a pliable or compliant material (before it is cured) to allow for focus and alignment, which is achieved by moving the lens relative to the lens holder. Optionally, the adhesive may be at least partially cured via ultraviolet (UV) light and may further be cured via additional curing. The UV and additional curing increases the tolerance stack of the finished assembly. Quick cure adhesives require UV curing and additional curing. This curing increases the tolerance stack of the finished assembly.

Optionally, active PCB focus and alignment may be achieved via a one piece lens assembly that is secured to the housing or lens holder utilizing adhesive initially, and then the imager PCB is actively moved relative to the housing or lens holder to set focus, alignment, and rotation, where a quick cure adhesive is used to set the focus, alignment, and rotation. The adhesive (that bonds the circuit board to the lens holder) acts as a compliant material (before it is cured) to allow for focus and alignment, which is achieved by moving the PCB relative to the lens holder.

Referring now to FIGS. 2-10D, the imaging system 10 includes a vehicular camera module 14 that may be configured to mount at an in-cabin side of the windshield 16 of the vehicle 12. The camera 14 includes an imager assembly 22 that comprises an imager printed circuit board (imager PCB) 24 having an imager 24a disposed thereat and a connector 24b, described in more detail below.

Figure 3:
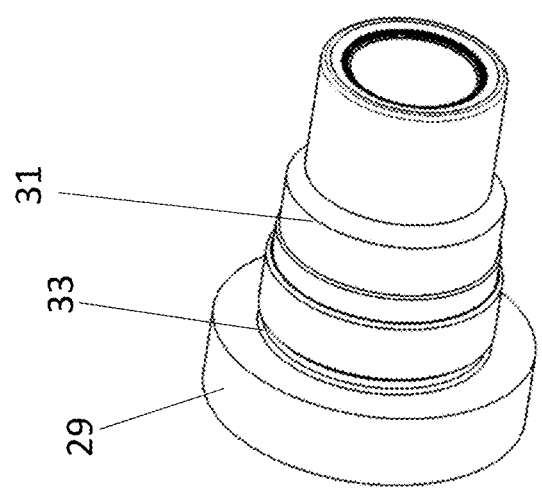
FIG. 3 is a side perspective view of the lens barrel of the camera module of FIG. 2.
Figure 4:
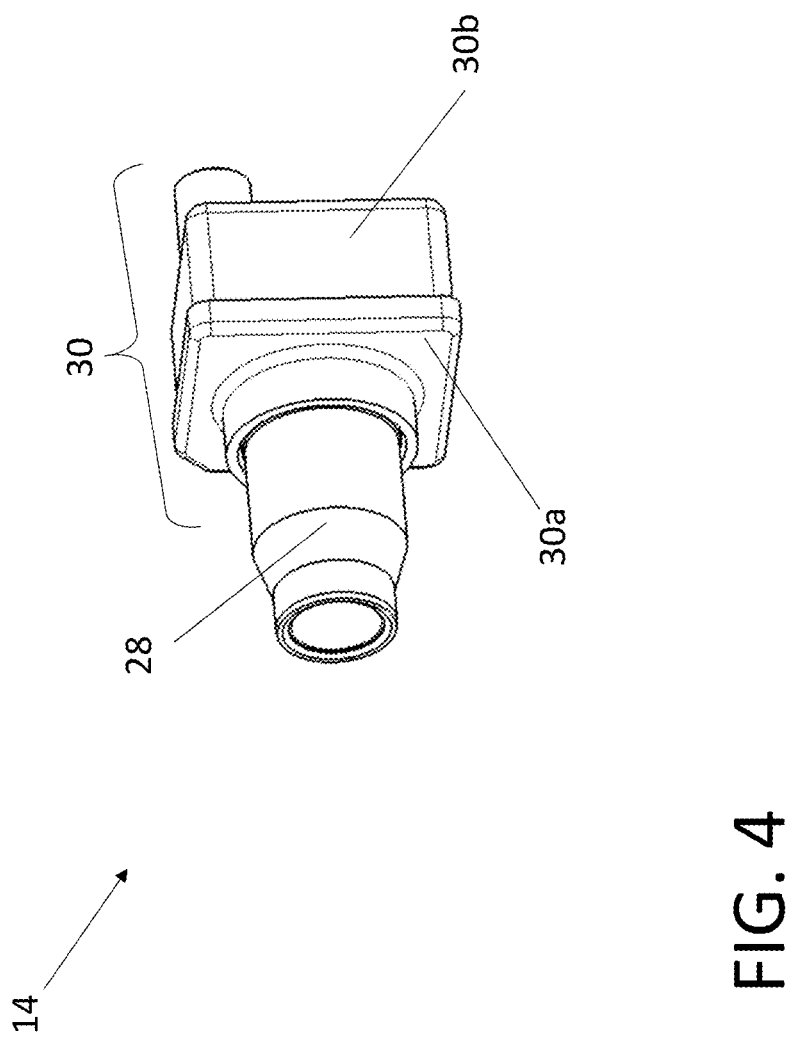
FIG. 4 is a front perspective view of the vehicle camera module of FIG. 2.
Figure 5:
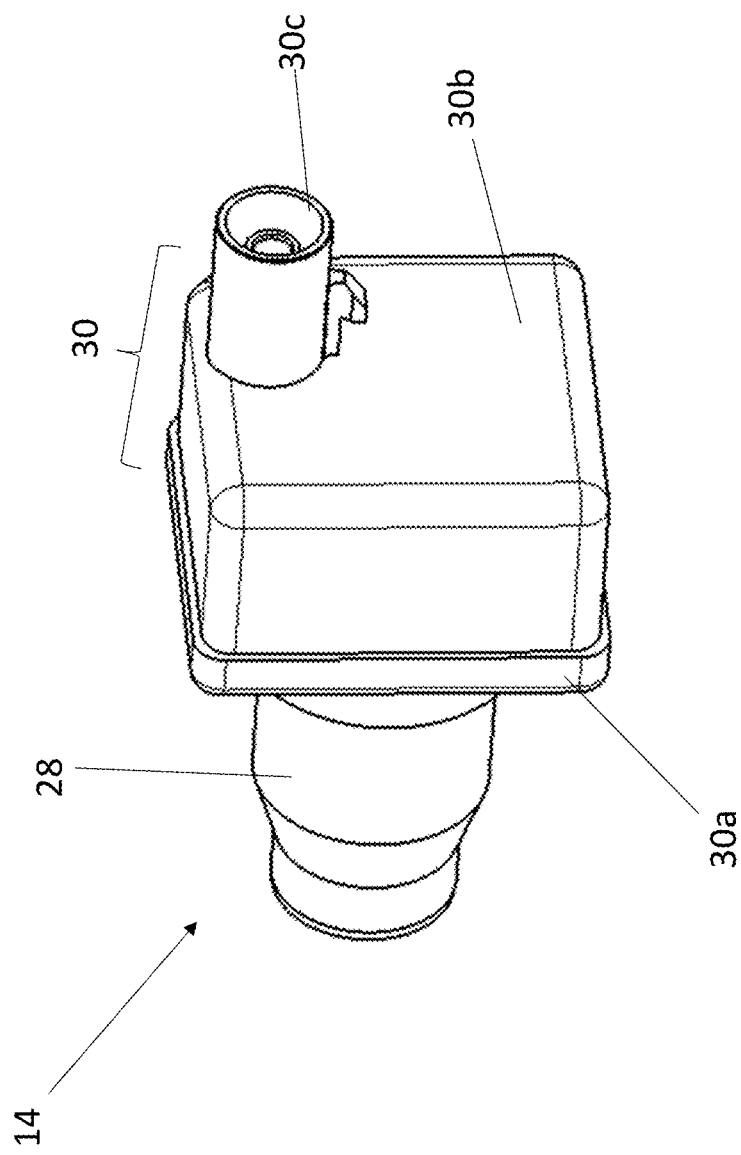
FIG. 5 is a rear perspective view of the vehicle camera module of FIG. 2.

The imager assembly 22 also includes a lens barrel 28 that accommodates a lens of a lens assembly (comprising a plurality of lens optic or elements). Optionally, the lens barrel 28 may include a flange 29 proximate to the lens and imager PCB 24 (FIG. 3). The flange 29 may be formed from a material having a different coefficient of thermal expansion (CTE) or temperature threshold as compared with the material of a body portion 31 of the lens barrel 28. The material/CTE difference may assist in accommodating the various temperature changes that may occur at a base 33 of the lens barrel 28 of the flange 29. This may assist in maintaining the stability of the lens barrel 28 along the imager PCB 24, which in turn maintains the focus of the lens of the camera module 14. The camera and materials may utilize aspects of or may otherwise comprise any suitable construction for controlling or accommodating changes in the camera when the camera is exposed to extreme temperatures, such as below −20 degrees C. or below −40 degrees C. and/or above 60 degrees C. or above 80 degrees C., such as by utilizing aspects of the cameras described in U.S. Publication Nos. US-2023-0016936; US-2020-0412925; US-2020-0033549; US-2020-0154020; US-2020-0137926; US-2020-0001787; US-2019-0306966; US-2019-0121051; US-2019-0124243 and/or US-2019-0124238, which are all hereby incorporated herein by reference in their entireties. It is further contemplated that an adhesive 40 utilized to couple the lens barrel 28 to the imager PCB 24 may be annular, square, rectangular, and any other shape practicable for coupling the lens barrel 28 to the imager PCB 24. The adhesive 40 may be disposed on various portions of the imager PCB 24 to minimize and generally control potential bending of the imager PCB 24 as a result of potential temperature changes.

As shown in FIGS. 2-10D, the lens barrel 28 is aligned with the imager 24a and adhesively attached at the imager PCB 24 via a thin layer of adhesive 40. The imager assembly 22 is configured to be attached or fastened to a housing 30 of the camera 14. The housing 30 includes a lens holder or front housing portion 30a and a connector portion or rear housing portion 30b. The front housing portion 30a of the housing 30 provides the primary mounting surface of the camera module 14 while the sidewalls of the front and rear housing portions 30a, 30b assist in preventing rotation of the lens or front housing portion 30a relative to the rear housing portion 30b. The front housing portion 30a includes an aperture 34 through which the lens barrel 28 extends. As described in more detail below, the lens barrel 28 is attached to the front housing portion 30a of the housing 30 at the aperture 34.

It is generally contemplated that the front housing portion 30a and the rear housing portion 30b may be laser welded to secure the imager assembly 22 within the housing 30. Additionally or alternatively, the front housing portion 30a may be attached to the rear housing portion 30b via fasteners. By way of example, not limitation, the fasteners are attached to or integral with the front housing portion 30a and, with the rear housing portion 30b mated with the front housing portion 30a, may be compressed or expanded at and over the rear housing portion 30b to retain the rear housing portion 30b with the front housing portion 30a. It is also contemplated that the fasteners may include screws, nails, rivets, and other practicable fasteners.

Figure 2:
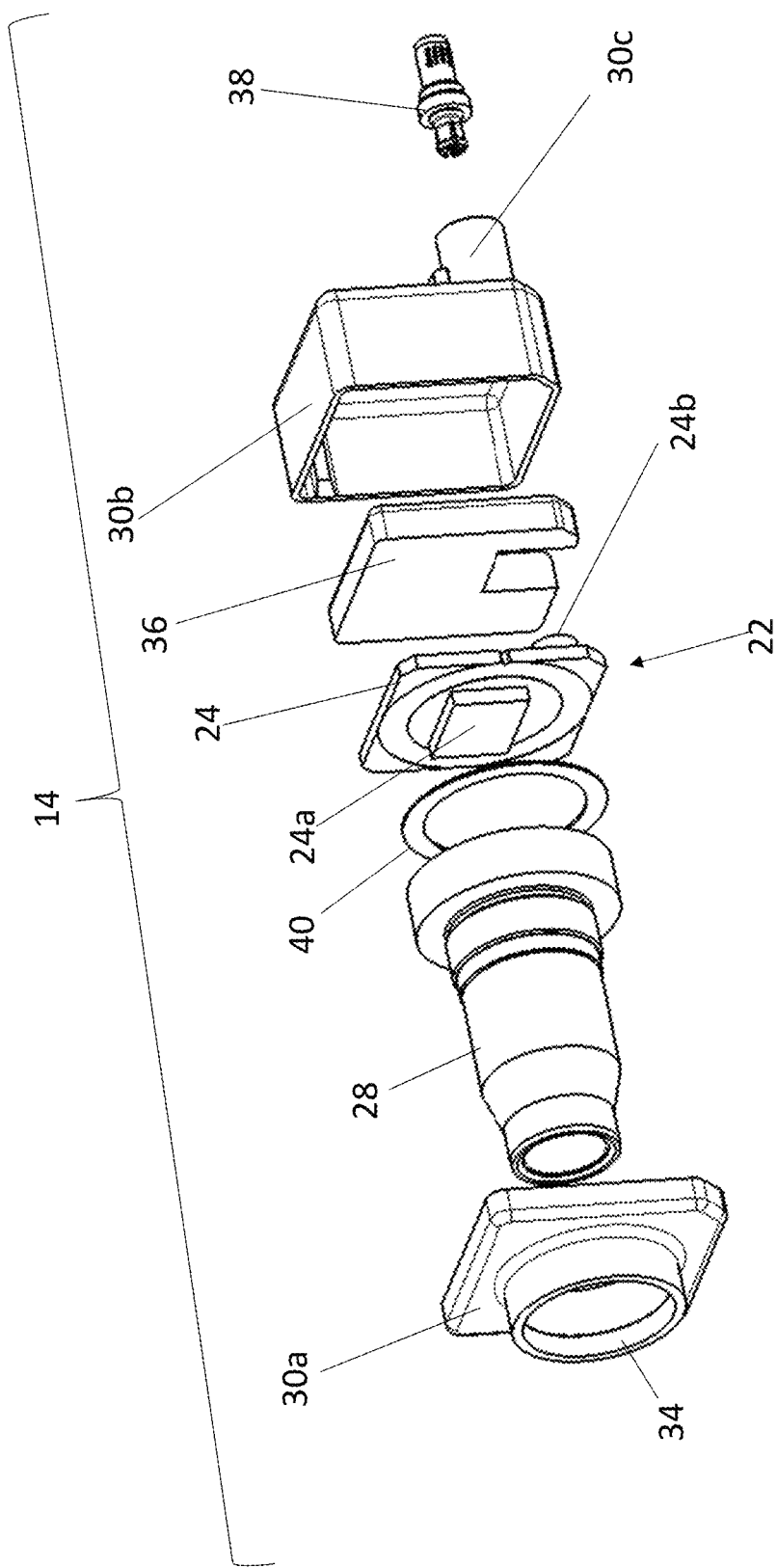
FIG. 2 is an exploded side perspective view of a vehicle camera module.

With further reference to FIG. 2, the camera module 14 also includes a thermal medium or thermally conductive element 36 disposed within the rear housing portion 30b of the housing 30 proximate the imager PCB 24. The thermally conductive element 36 may comprise any suitable thermally conductive material or pad, and functions to draw or dissipate heat generated at the imager PCB 24 during operation of the camera to the rear housing portion 30b, which may comprise heat dissipating fins to further enhance heat dissipation from the camera 14.

Figure 6:
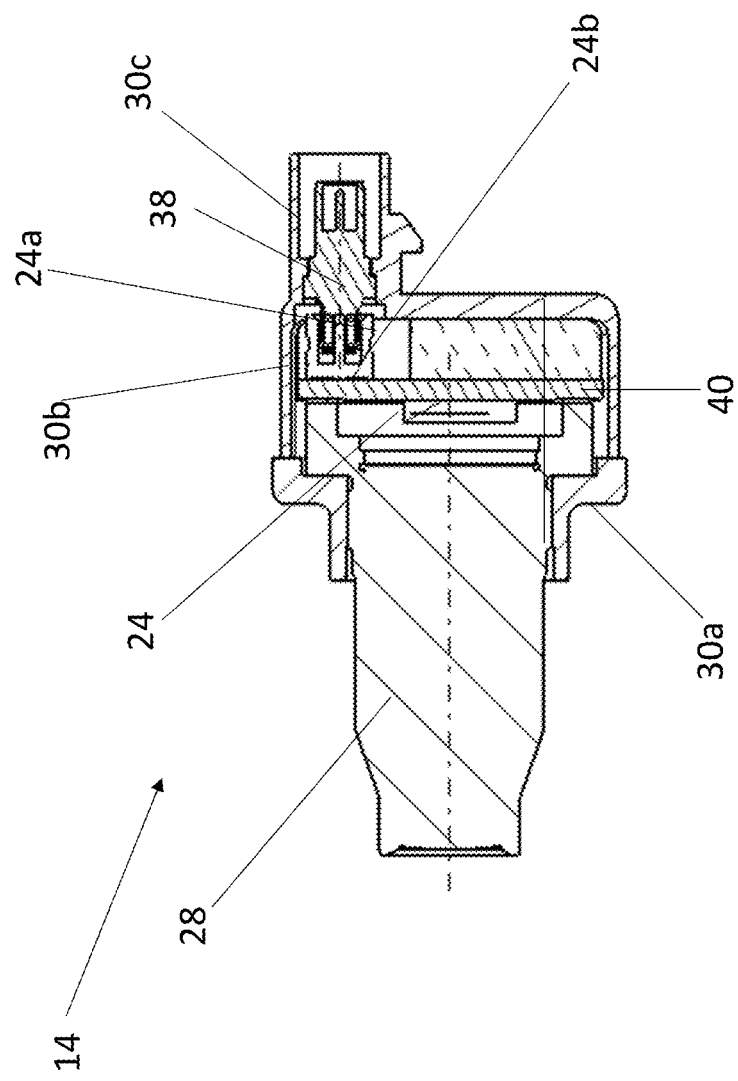
FIG. 6 is a cross-sectional view of a camera module showing forces applied to a connector of the camera module.

The rear housing portion 30b of the housing 30 may also include an extension or connector portion 30c through which a connector element 38 may be positioned. The connector element 38 may be pressed to the rear housing portion 30b of the housing 30 (which may be formed of a metal material) for ground contact and attaches to the connector portion 30c. As shown in FIG. 6, the connector 24b may be positioned at a perimeter region of the imager PCB 24 (at a location where the opposite or front side of the imager PCB 24 is adhered to the lens barrel 28). The connector element 38 is disposed within the rear housing portion 30b and thus is operably coupled to the connector 24b at the imager PCB 24 in a manner that reduces stress on the imager PCB 24, as described in more detail below. The rear housing portion 30b generally floats to follow the imager PCB 24 position to minimize stress on the imager PCB 24, which ultimately minimizes potential shifts in focus, as also described below.

As illustrated in FIG. 6, the connector 24b is disposed at a side or perimeter region of the imager PCB 24. In applications where the connector 24b may be disposed at a central region of the imager PCB 24, forces placed on the connector 24b may transfer to the imager PCB 24 and ultimately deflect the imager PCB 24 on the order of micrometers. Such deflection may alter the focus of the camera module 14, in particular if the connector 24b were to be otherwise centrally positioned relative the imager PCB 24. By positioning the connector 24b at the perimeter region of the imager PCB 24 that is opposite the region where the lens holder is adhesively attached to the imager PCB 24, deflection of the imager PCB 24 is limited when forces act at the connector 24b, such as when the camera 14 is electrically connected to a wire harness of a vehicle 12. The adhesive 40 disposed between the imager PCB 24 and the lens barrel 28 supports the connector 24b along a perimeter or edge region of the imager PCB 24. It is generally contemplated that the adhesive 40 may be annularly disposed around a base of the lens barrel 28 to couple a perimeter edge of the imager PCB 24 to the base of the lens barrel 28. The engagement of the connector 24b with the edge of the imager PCB 24 minimizes the forces that may otherwise shift the focus of the lens of the camera module 14.

Figure 7:
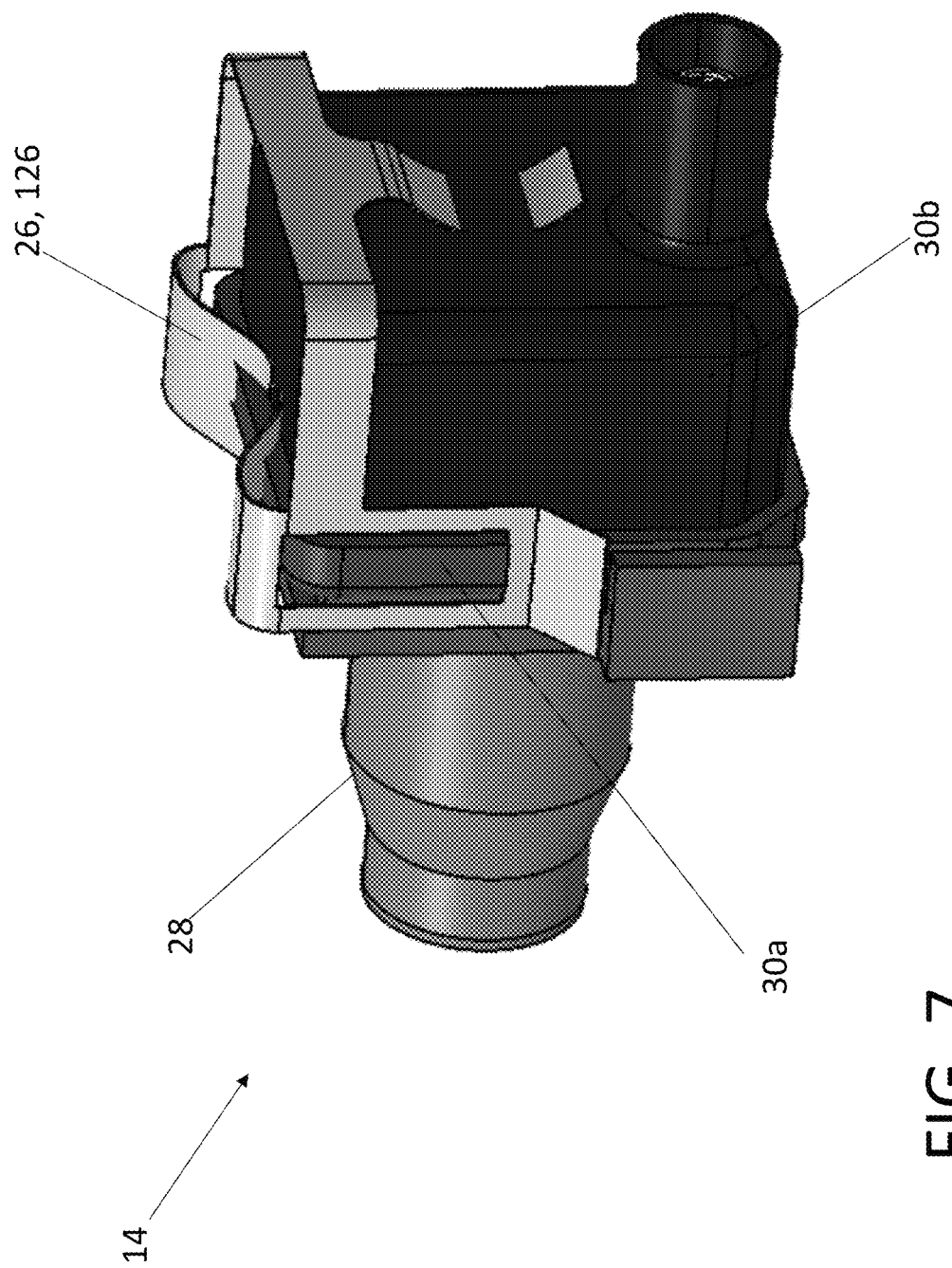
FIG. 7 is a rear perspective view of the vehicle camera module, shown with a retention element coupled to a housing.
Figure 8B:
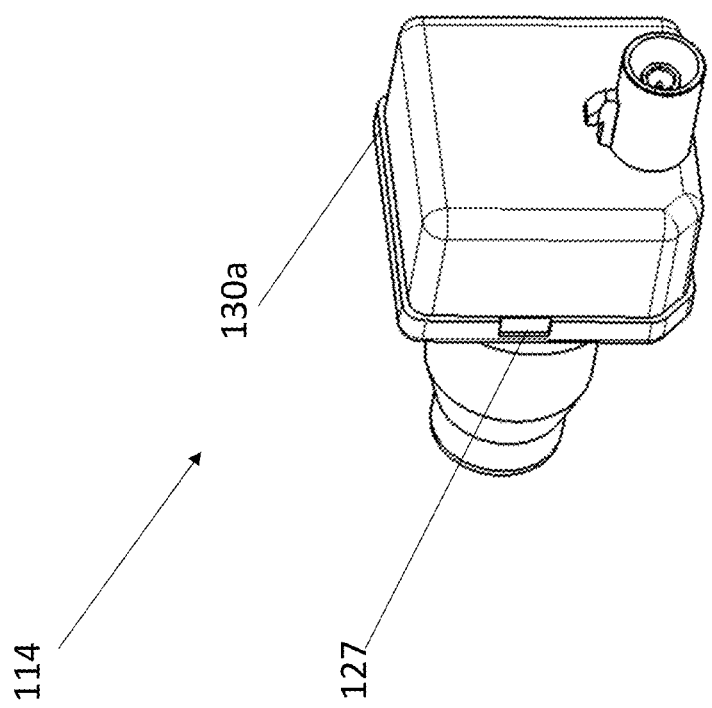
FIG. 8B is a rear perspective view of the vehicle camera module, shown with attachment features at the front housing for attaching the retention element of FIG. 7 to the vehicular camera module.
Figure 8A:
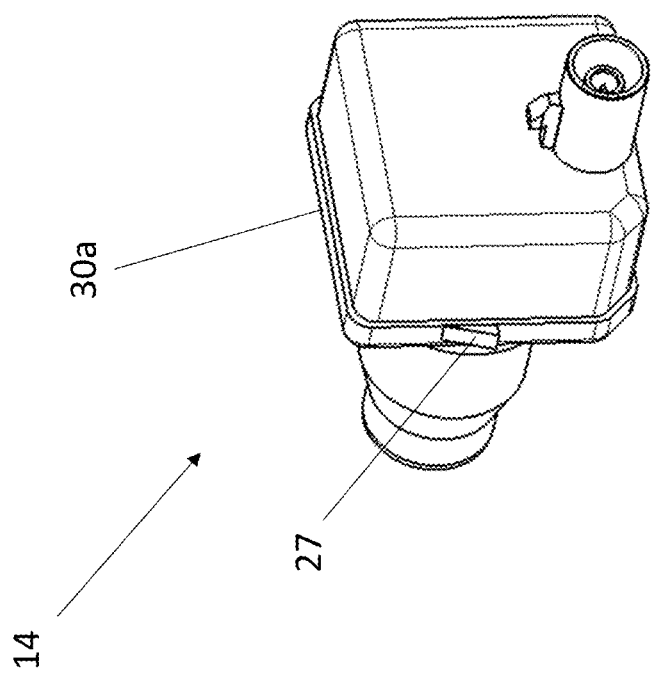
FIG. 8A is a rear perspective view of the vehicle camera module, shown with attachment features at the front housing for attaching the retention element of FIG. 7 to the vehicular camera module.

Optionally, and such as shown in FIG. 7, the camera may also include a retention feature or element or clip 26 that may retain the camera module 14 relative the windshield 16 of the vehicle 12 (or elsewhere at the vehicle). The retention feature 26 may be disposed on the sides of the camera module 14, such that the camera module 14 may be mounted proximate the windshield 16 (or elsewhere at the vehicle) using a snap-fit configuration. The retention feature 26 includes retention arms 26a, 126a that extend along the sides of the camera module 14 and a tension arm 26b, 126b engaged with the rear housing portion 30b to secure the retention feature 26 with the camera module 14. As depicted in FIGS. 8A and 8B, the front housing portion 30a, 130a of the camera module 14, 114 may include attachment features 27, 127 to which the retention arms 26a, 126a of the retention feature 26, 126 may be coupled. The attachment features 27 are illustrated in FIG. 8A as at least partially extending from the front housing portion 30a, such that the retention arms 26a, 126a of the retention feature 26 may snap-fit with an edge of the attachment features 27. For example, the retention arms 26a, 126a may each include an aperture at which the attachment features 27 may be received. In an alternate embodiment (FIG. 8B), the attachment features 127 are defined as cutouts of the front housing portion 130a, and the retention arms 126a of the retention feature 126 may snap-fit within the attachment features 127 at the aperture of each retention arm 126a to attach the retention feature 126 to the front housing portion 130a.

Figure 9:
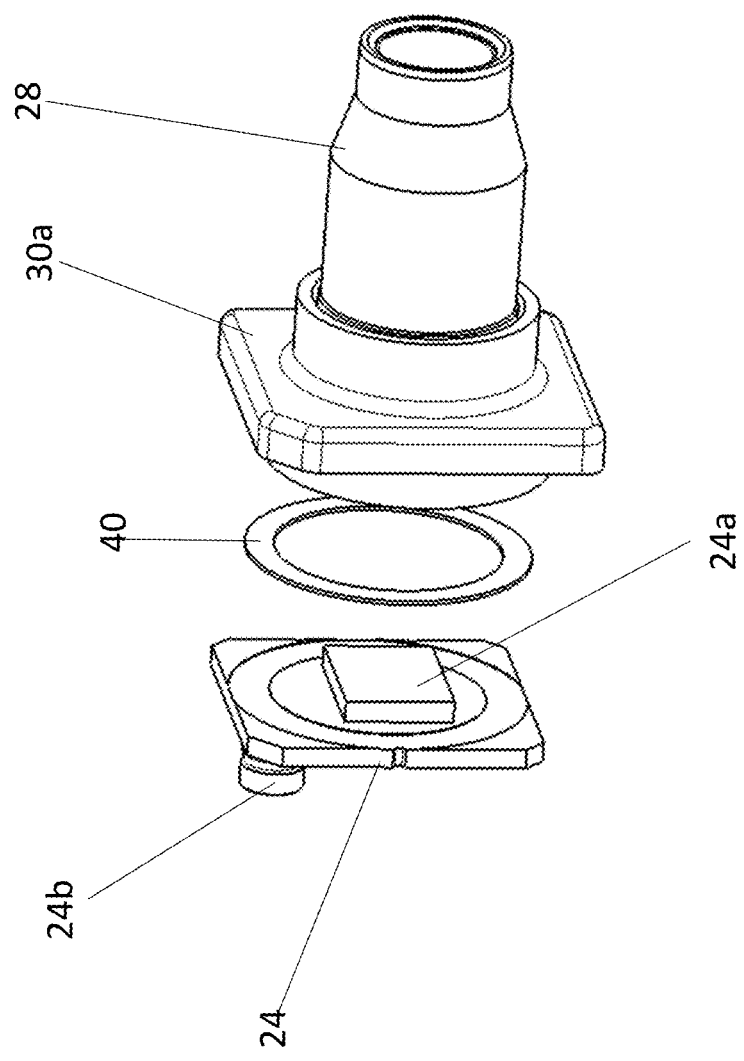
FIG. 9 is an exploded side perspective view of a portion of the vehicle camera module, showing a lens barrel coupled to a front housing portion of a housing, an imager printed circuit board, and an adhesive disposed therebetween.
Figure 11:
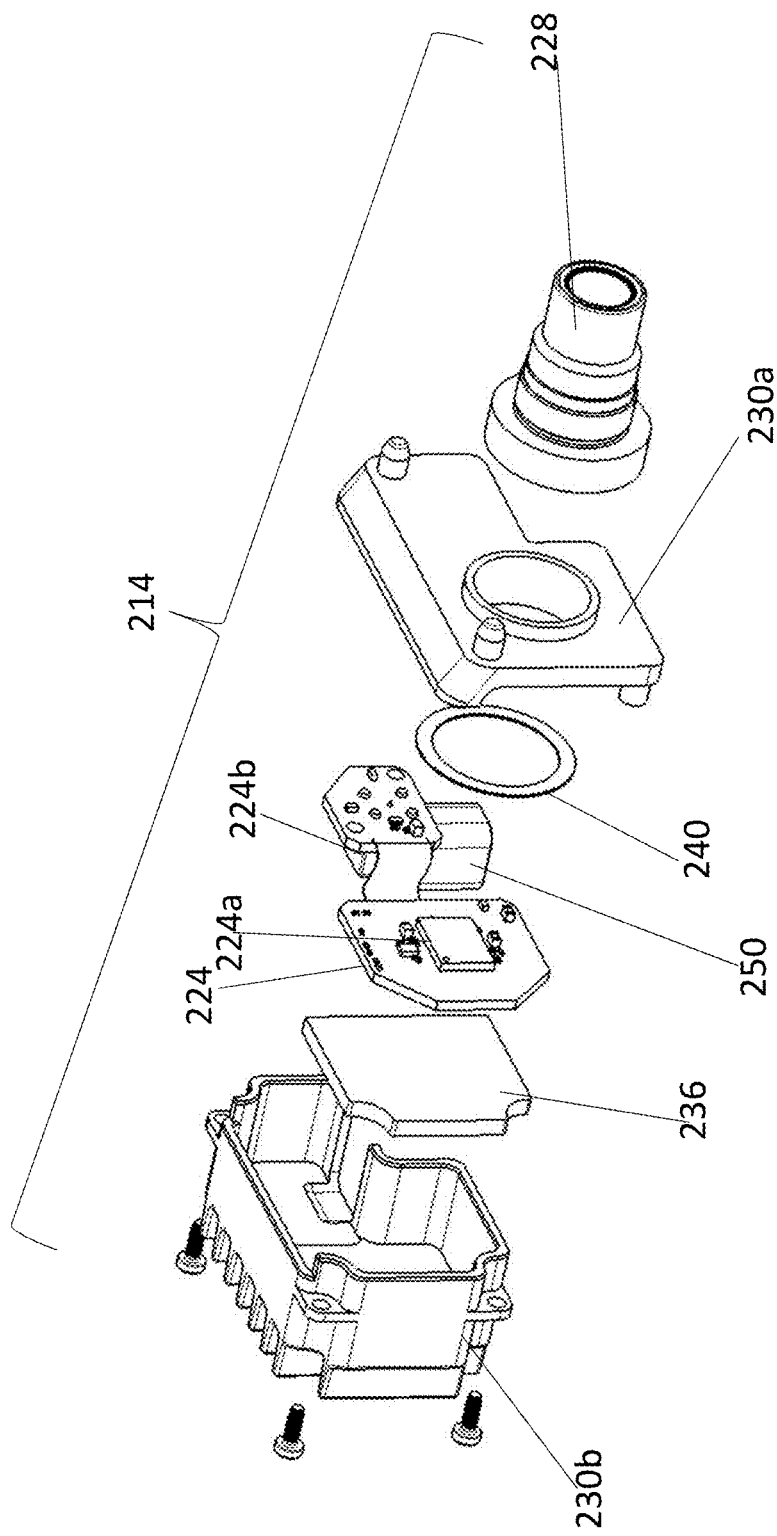
FIG. 11 is an exploded perspective view of a camera module with an imager printed circuit board and a connector coupled to the imager printed circuit board via a connector printed circuit board.
Figure 12:
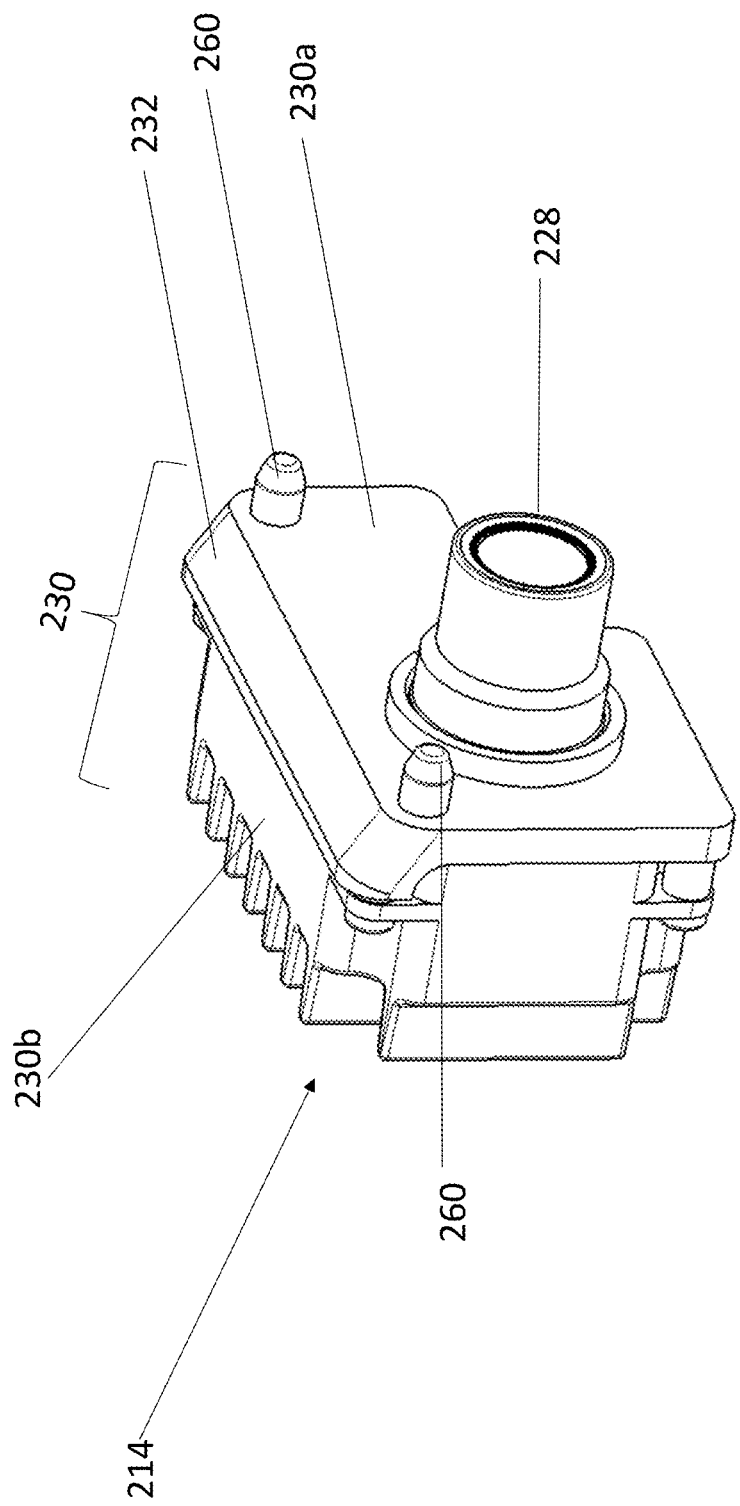
FIG. 12 is a front perspective view of the camera module of FIG. 11.
Figure 13:
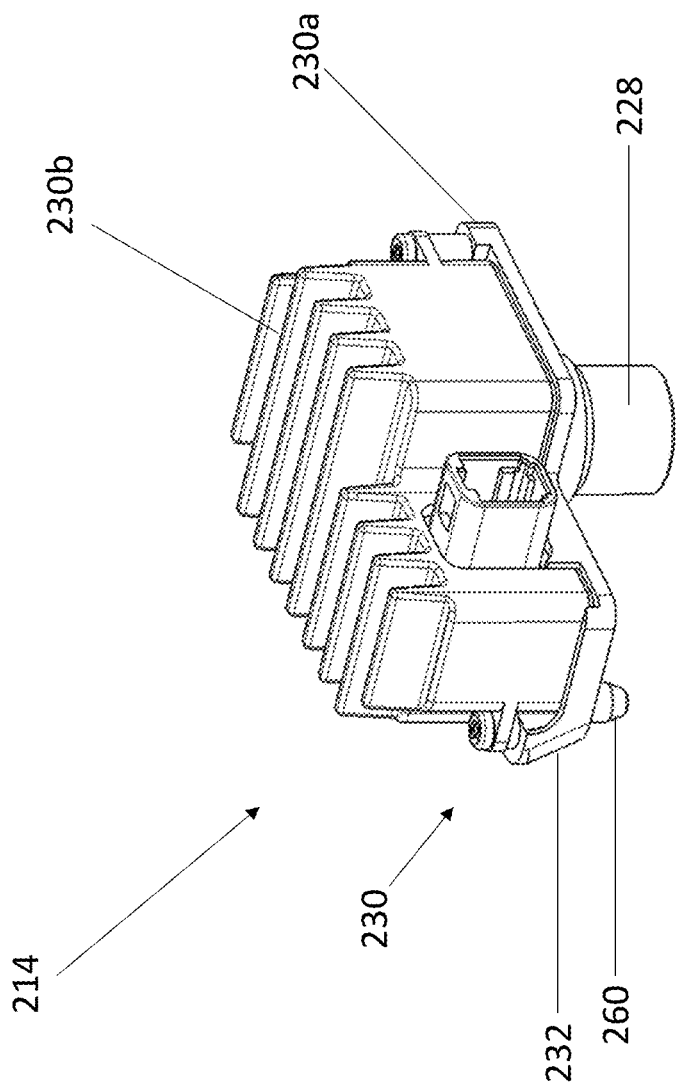
FIG. 13 is a side perspective view of the camera module of FIG. 11.
Figure 14:
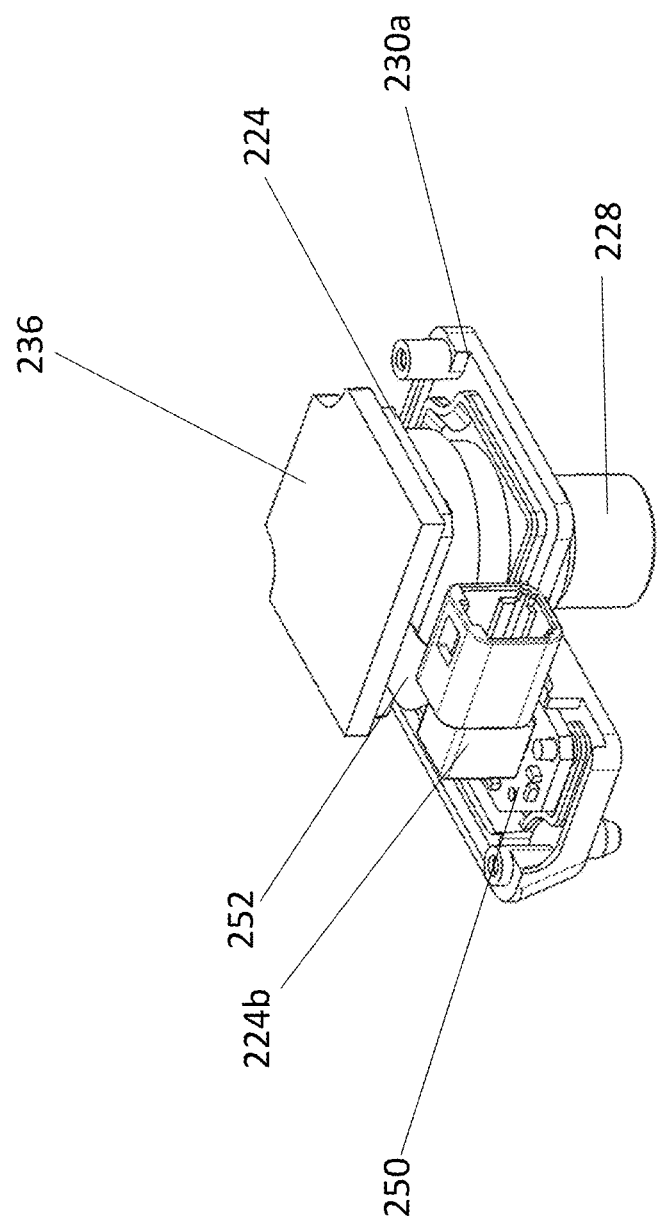
FIG. 14 is a side perspective view of the camera module of FIG. 11, with the housing removed to show the connector coupled to the imager printed circuit board via the connector printed circuit board.

Referring now to FIG. 9, the imager PCB 24 is focused and coupled directly to the lens barrel 28 via an adhesive 40, rather than an intermediate holder. Stated differently, the imager PCB 24 may be focused and adhesively bonded at six-degrees of freedom relative to the lens barrel 28 to minimize potential variation in camera focus over time. The adhesive 40 is disposed between the lens barrel 28 and the imager PCB 24, and the thickness of the adhesive 40 is minimized to reduce the sources of variation in camera focus over time and thus to increase the overall optical stability of the lens barrel 28 relative the imager PCB 24. Fixturing the camera mounting datums at the lens holder 30a during the alignment and bonding and adhering the lens barrel 28 directly to the imager PCB 24 provides optimized alignment of the camera axis and rotation relative to the vehicle 12.

Referring to FIGS. 10A-10D, the lens barrel 28 is operably coupled to the front housing portion 30a, such that the lens barrel 28 extends through the aperture 34 defined by the front housing portion 30a. As illustrated in FIGS. 10A and 10B, the lens barrel 28 may be threadedly coupled to the front housing portion 30a. The lens barrel 28 may be threadedly coupled to the housing 30, and a thread locker adhesive 42 (FIG. 10A) may be applied between the lens barrel 28 and the housing 30 to prevent unthreading of the lens barrel 28. The thread locker adhesive 42 provides a seal between the front housing portion 30a of the housing 30 and the lens barrel 28. Additionally or alternatively, the lens barrel 28 may be coupled to the housing 30 via a threaded locknut 44 in combination with the thread locker adhesive 42. The threaded locknut 44 assists in providing a seal in combination with the thread locker adhesive 42, while retaining rotational control of the position of the lens barrel 28. The rotational control assists in maintaining the focus of the lens barrel 28 during operation of the system 10. In an additional or alternate configuration illustrated in FIG. 10C, the lens barrel 28 is coupled to the front housing portion 30a of the housing 30 via a non-threaded connection with adhesive 46 to provide a seal and control of the rotational position of the lens. Optionally, and such as illustrated in FIG. 10D, the lens barrel 28 may be sealed with the front housing portion 30a of the housing 30 via an O-ring 48. It is generally contemplated that the O-ring 48 may be incorporated singly or in any combination of the coupling mechanisms between the lens barrel 28 and the housing 30 set forth herein, such that the O-ring 48 may be utilized with any of the adhesives 40, 42, 46 set forth herein.

With reference now to FIGS. 11-17, a front housing portion 230a of a camera module 214 comprises alignment pins or pins or mounting datums or mounting structures 260 that are used to position and mount the camera 214 at the vehicle. The pins 260 provide alignment and may be spaced apart to reduce rotation of the camera 214 at the vehicle. For example, the wide spacing of the pins 260 minimizes rotation of the camera 214 by engaging respective receiving portions of a mounting structure at a windshield of the vehicle (such as a mounting bracket adhesively attached or bonded at an in-cabin side of the windshield) to maintain the alignment of the camera 214 relative to the windshield. The front housing portion 230a provides the primary mounting or front surface for the camera 214 and also includes a chamfered or slanted upper edge region 232 to adapt the camera housing 230 and camera 214 for the angled windshield of the vehicle. Pressure at the rear housing portion 230b of the housing 230 presses the camera 214 toward the windshield or portion of the vehicle at which the camera 214 is mounted. By providing the mounting datums or pins or structure 260 at the front housing portion 230a, the camera 214 provides optimized alignment of the camera axis and rotation to the vehicle when the camera module is positioned at and attached to a mounting structure at the in-cabin side of the vehicle windshield.

The camera module 214 includes a thermal medium or thermally conductive element 236 disposed within the rear housing portion 230b of the housing 230 proximate the imager PCB 224 and a lens barrel 228 that extends through an aperture of the front housing portion 230a and is attached to an imager printed circuit board (imager PCB) via an adhesive 240. The imager PCB 224 is focused and attached directly to an inner end of the lens barrel 228 via the adhesive 240 to increase the overall optical stability of the lens barrel and the imager PCB 224. A connector or electrical connector 224b may be coupled to a connector printed circuit board (connector PCB) 250, which is electrically connected to the imager PCB 224. The connector 224b is attached to the connector PCB 250 and extends through an opening of the rear housing portion 230b to electrically connect the camera module 214 to a wire harness of the vehicle. The positioning of the connector 224b with the connector PCB 250 minimizes the interaction between the connector 224b and the imager PCB 224 and, ultimately, the lens of the camera module 214. For example, the connector PCB 250 is laterally offset from and generally horizontally aligned with (and does not overlap) the imager PCB 224 to minimize the interaction between the connector PCB 250 and the imager PCB 224. The connector PCB 250 is electrically coupled to circuitry of the imager PCB 224 via a flexible connection 252. The flexible connection 252 is configured to absorb tolerances and forces between the connector 224b and the imager PCB 224, such that the imager PCB 224 is free from acting forces that may occur when the camera module 214 is electrically connected to a vehicle wire harness.

Figure 15:
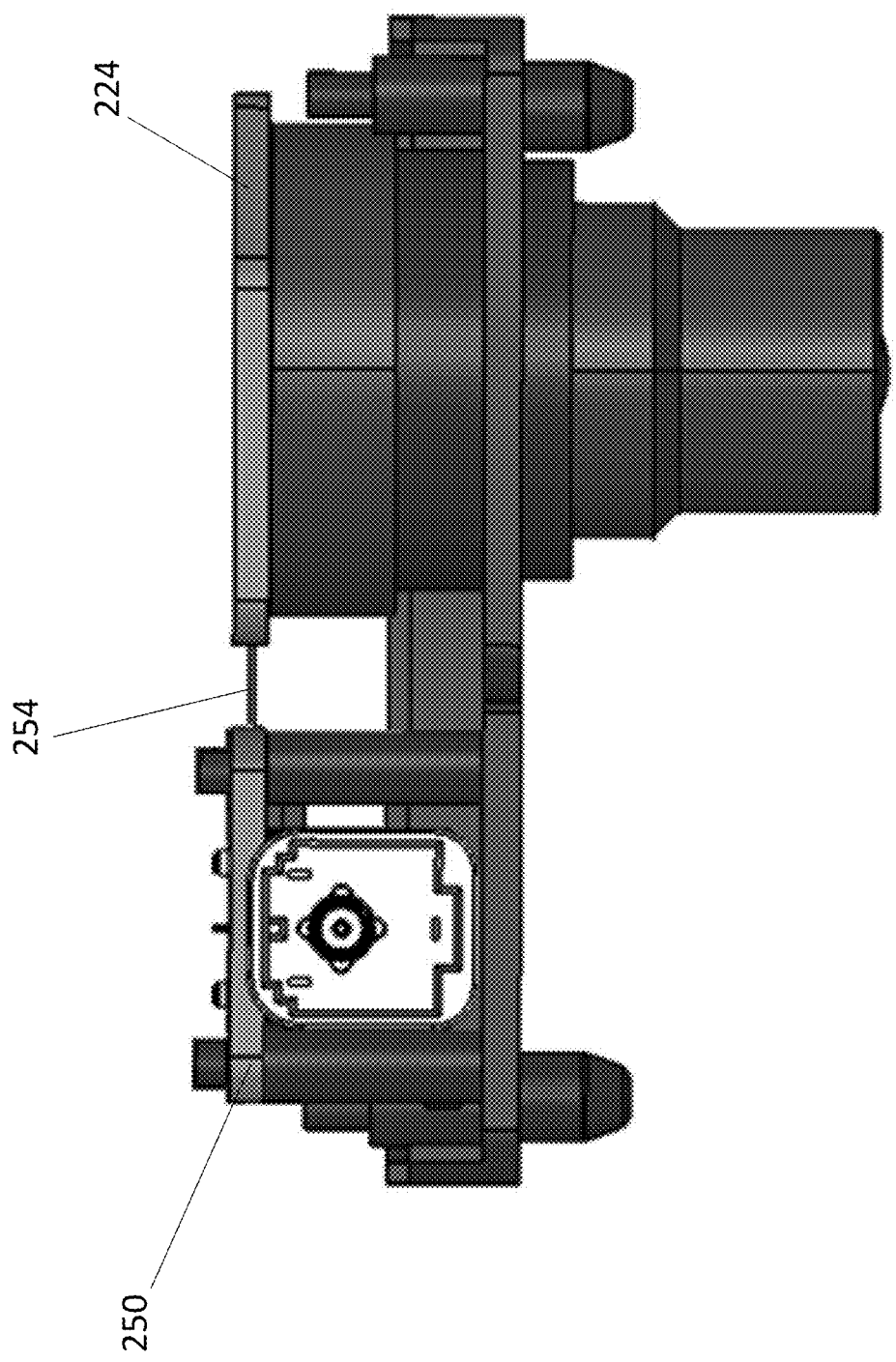
FIG. 15 is a plan view of a portion of a camera module, showing the connector coupled to the imager printed circuit board via a connector printed circuit board and a flexible electrical connector of the connector printed circuit board.
Figure 16:
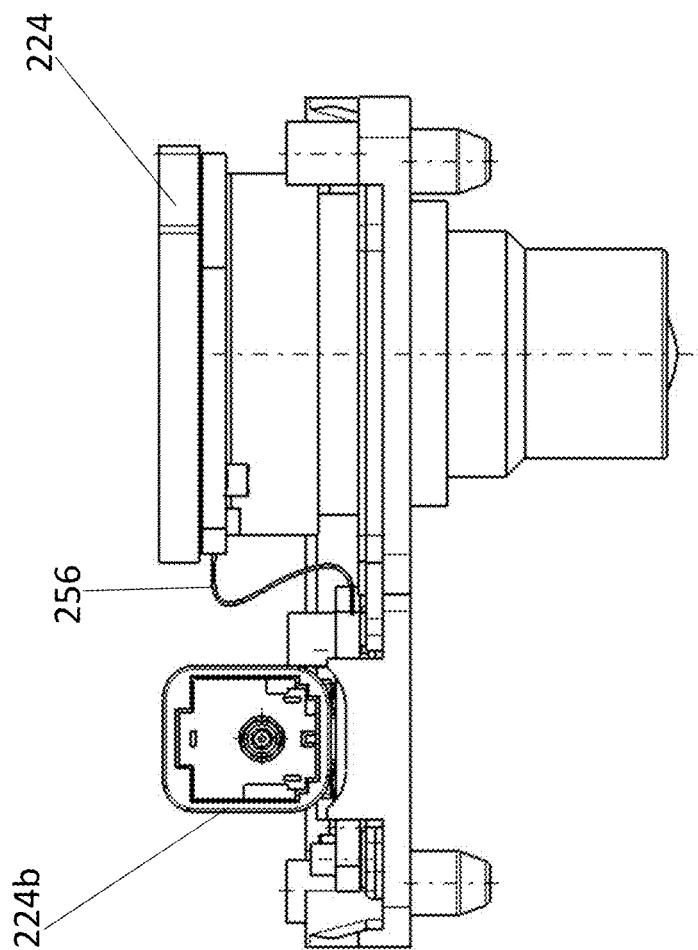
FIG. 16 is a plan view of a portion of a camera module, showing the connector coupled to the imager printed circuit board via a connector printed circuit board via a plurality of flexible polyimide layers.
Figure 17:
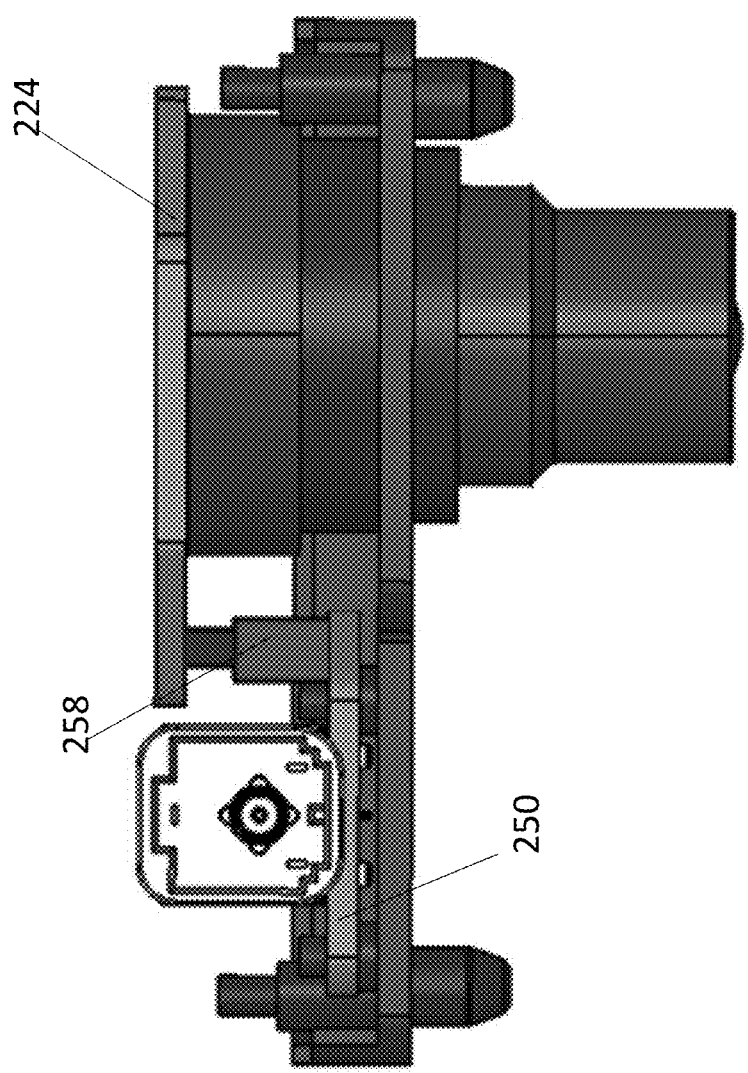
FIG. 17 is a plan view of a portion of a camera module, showing the connector coupled to an imager printed circuit board via a biasing connector element disposed between the imager printed circuit board and a connector printed circuit board.

The flexible connection 252 between the connector PCB 250 and the imager PCB 224 may be made via various flexible connectors or connecting elements 252. For example, FIG. 15 depicts a semi-flex connector PCB 250, which may be part of the imager PCB 224, with traditional layers typically configured as part of a printed circuit board (PCB) are at least partially removed, leaving the flexible connection 252 between the two layered PCBs. The removal of the additional layers provides a flexible section 254 between the connector PCB 250 and the imager PCB 224, while minimizing the overall bendability. As shown in FIG. 15, the connector PCB 250 and the imager PCB 224 are in the same plane, and the connector PCB 250 is attached at and spaced from the front housing portion via posts or spacers. Optionally, and such as shown in FIG. 16, the flexible connection 252 may be made via a plurality of flexible polyimide layers 256 that are utilized to couple the connector PCB 250 with the imager PCB 224. The flexible polyimide layers 256 may be described as having a rigid-flex structure and extend between the connector PCB 250 and the imager PCB 224. Optionally, and such as shown in FIG. 17, the flexible connection 252 may be made via a biasing member or spring-loaded electrical connector 258 that couples the connector PCB 250 with the imager PCB 224 and is configured to absorb the position differences between the connector PCB 250 and the imager PCB 224. Stated differently, the biasing member 258 may absorb forces that may occur as the connector 224*b* may be adjusted or repositioned during movement of the vehicle. The spring-loaded connector or biasing member 258 may utilize aspects of the connectors described in U.S. Pat. Nos. 10,484,587; 10,466,563; 10,264,219; 9,878,669 and/or 9,565,342, and/or U.S. Publication No. US-2022-0089102, which are hereby incorporated herein by reference in their entireties.

Figure 18A:
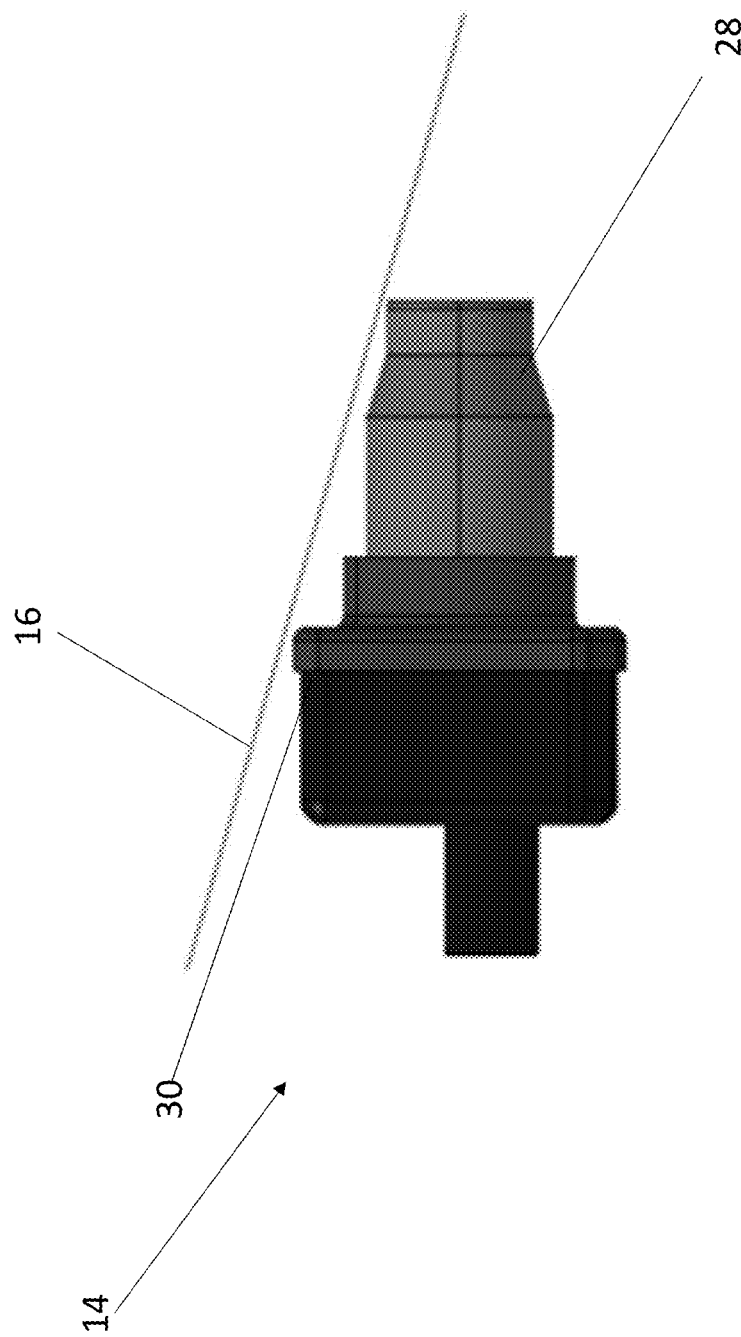
FIG. 18A is a side elevation of vehicle camera module proximate a windshield of a vehicle.
Figure 18B:
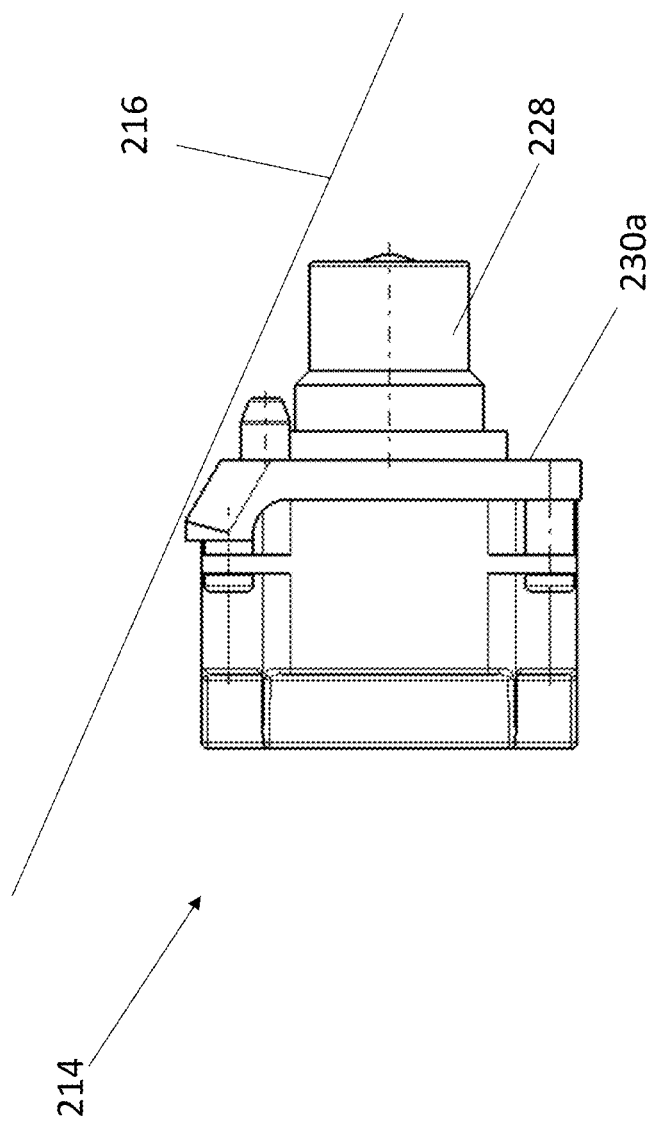
FIG. 18B is a side elevation of vehicle camera module proximate a windshield of a vehicle.
Figure 18C:
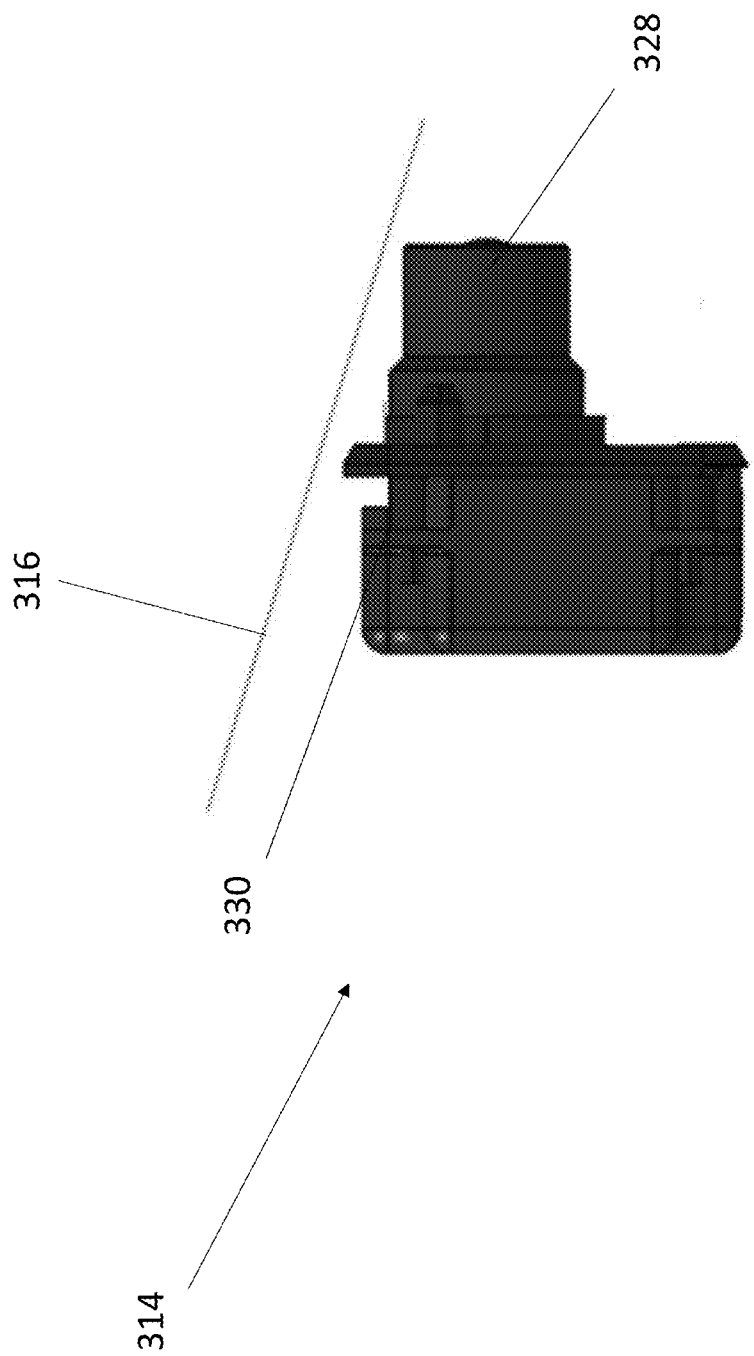
FIG. 18C is a side elevation of vehicle camera module proximate a windshield of a vehicle.
Figure 19:
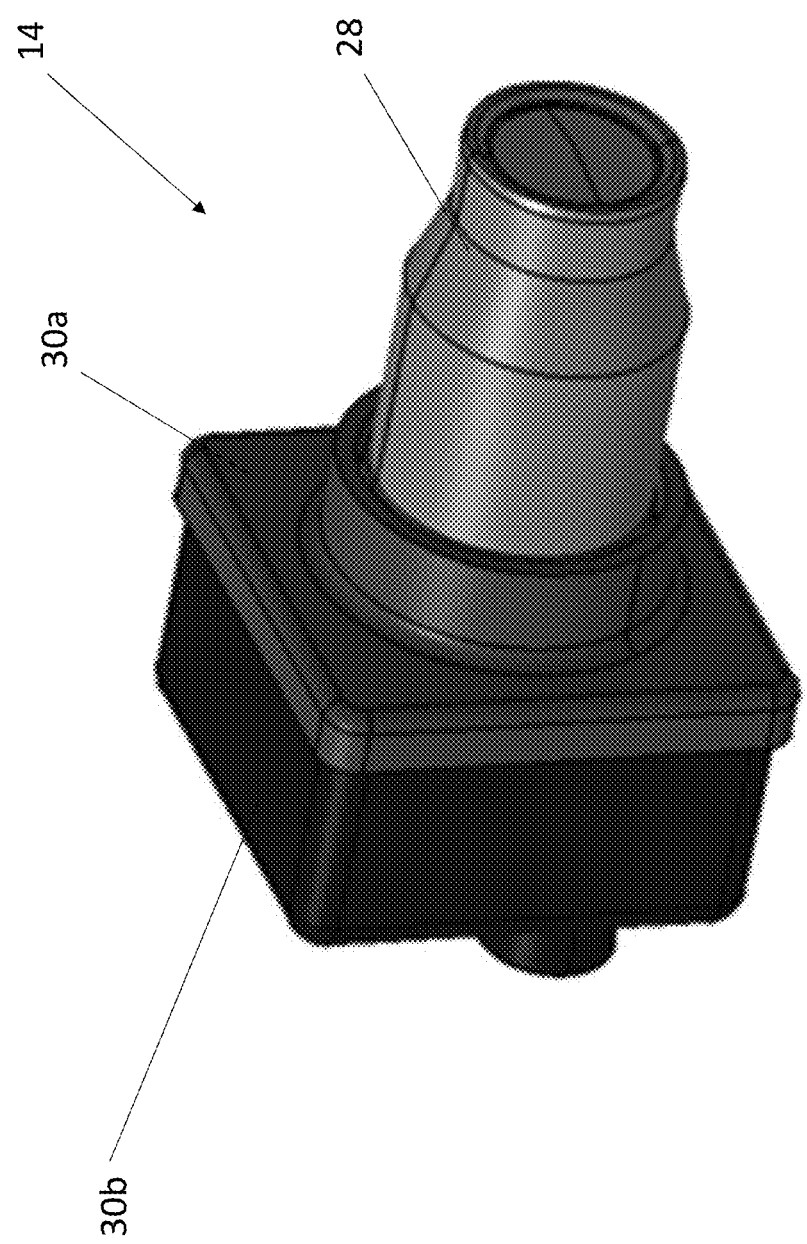
FIG. 19 is a front perspective view of the camera module of FIG. 18A.
Figure 20:
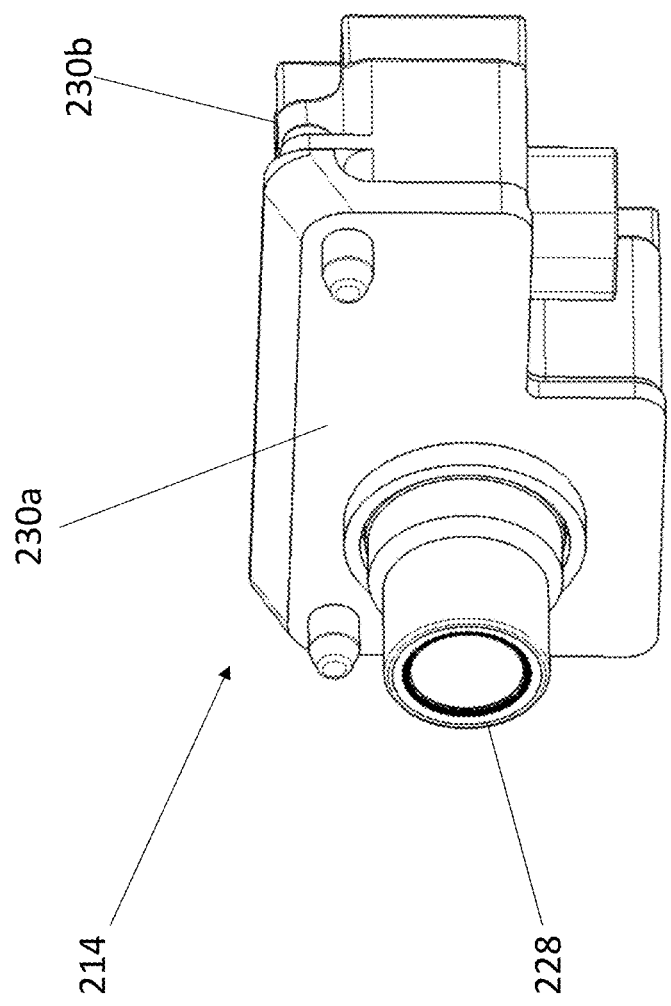
FIG. 20 is a front perspective view of the camera module of FIG. 18B.
Figure 21:
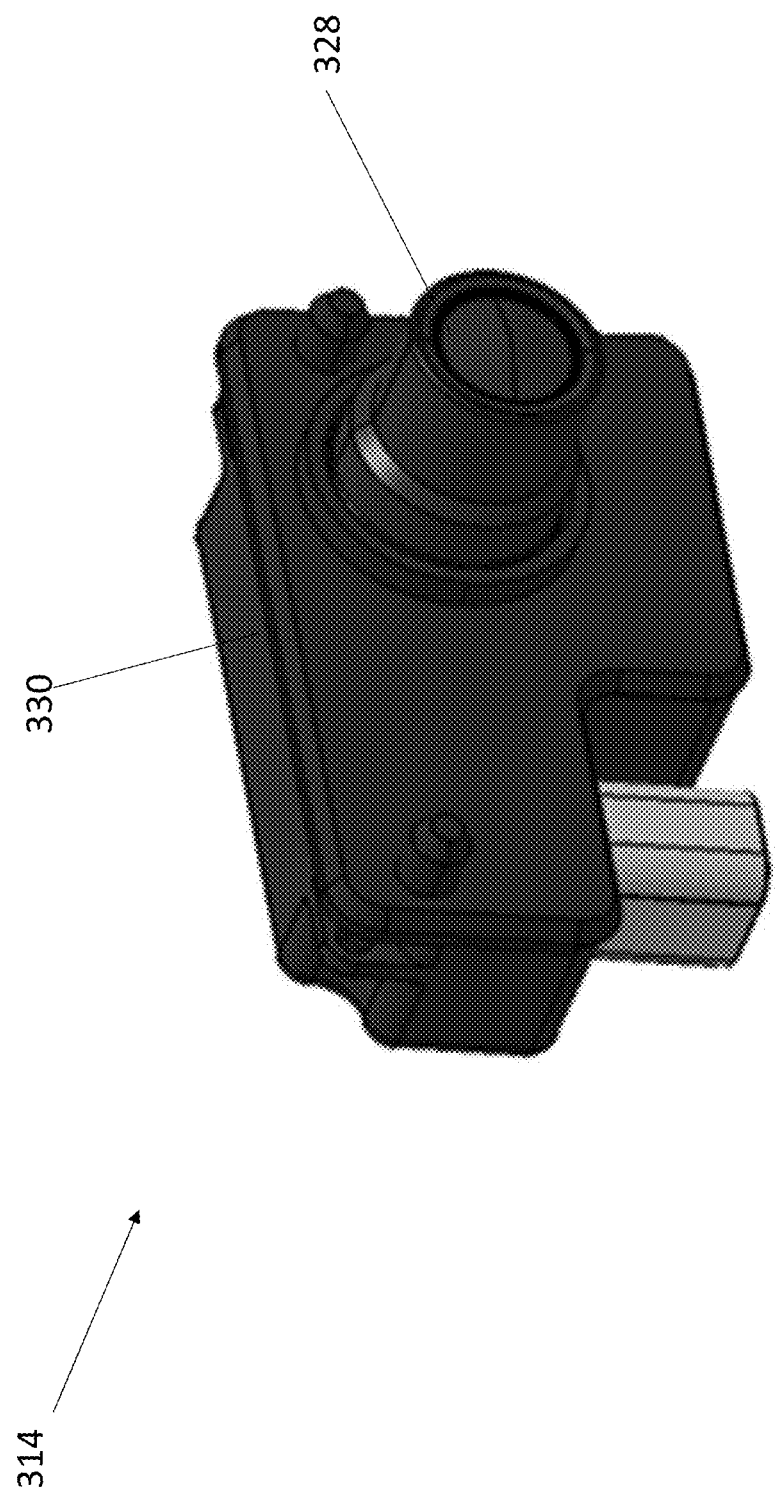
FIG. 21 is a front perspective view of the camera module of FIG. 18C.

As generally illustrated in FIGS. 18A-18C, various windshields have a shallower angle for aerodynamics. FIGS. 19-21 illustrate various camera modules 14, 214, 314 that may be utilized with the various windshields based on the respective angle of the windshield. The camera module 14 (FIGS. 18A and 19) may have a lens barrel 28 that extends from the housing 30 to accommodate for a shallower angle of the windshield 16. The camera module 214 illustrated in FIGS. 18B and 20 includes a chamfer 232 or angled front edge on the front housing portion 230*a*. The chamfer 232 is established along a top edge of the front housing portion 230*a* and accommodates or corresponds with the slope of the windshield 216. The camera module 314 of FIGS. 18C and 21 is illustrated as having the lens barrel 328 mounted near the top of the housing 330 while remaining clear of the windshield 316.

Figure 22:
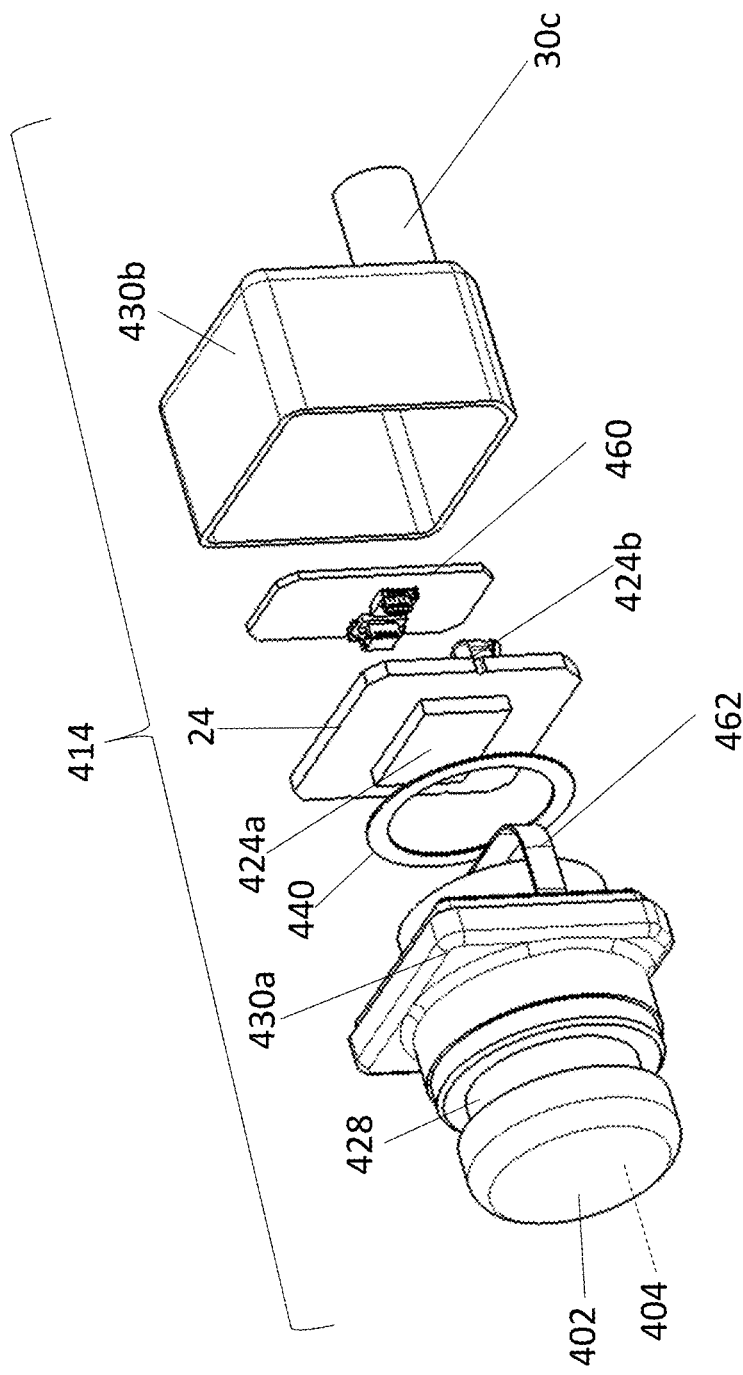
FIG. 22 is an exploded perspective view of a camera module with a heated lens and including an imager printed circuit board connected to a secondary printed circuit board via a board-to-board connector.
Figure 23:
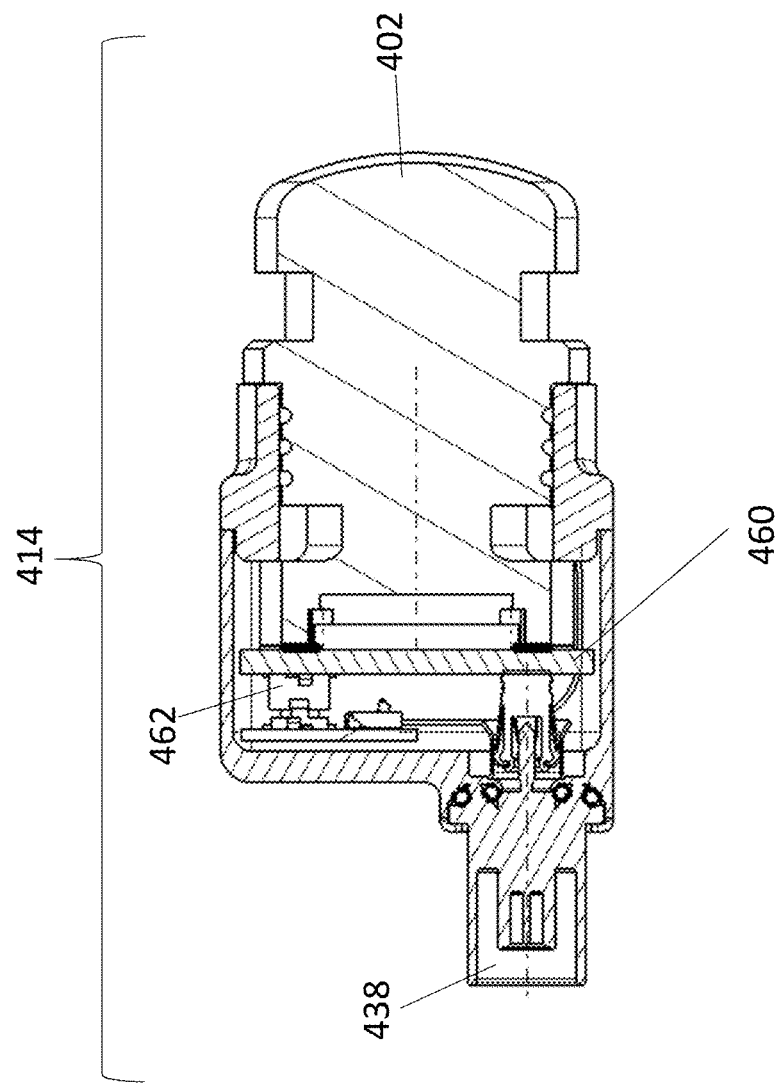
FIG. 23 is a cross-sectional view of the camera module of FIG. 22.

Referring to FIGS. 22 and 23, a camera module 414 includes a heated lens 402 that has a lens heater or heater element 404 (which may comprise an electrically conductive coating at a lens element of the lens or an electrically conductive ring or foil within and partially along the lens barrel or other suitable heating element that generates heat when an electrical current is applied). The camera module 414 also includes a front housing portion 430*a* that is attached to a lens barrel 428 of the camera module 414 and a rear housing portion 430*b* that may also include an extension or connector portion 430*c* at or in which an electrical connector 438 may be positioned. The camera includes both an imager printed circuit board (imager PCB) 424 and a heating element printed circuit board (heating element PCB) or secondary or connector printed circuit board (secondary PCB) 460, with circuitry of the imager PCB electrically connected to circuitry of the secondary PCB via a via a board-to-board connector 462. The board-to-board connector 462 provides sufficient stability for the smaller size of the secondary PCB 460, so that no further mechanical support is needed. The connector 424*b*, such as a floating coax connector, of the camera module 414 is located on the imager PCB 424 and extends from the imager PCB to a connector portion 430*c* of the rear housing portion 430*b* of the camera module 414.

The heater element 404 at the lens is electrically connected to a flexible connector or flexible printed circuit (FPC) 450, which is attached to and extends from the front housing portion 430*a*. A connecting end of the flexible connector 450 is electrically connected to a connector 460*a* located on the secondary printed circuit board (PCB) 460.

As with the configurations discussed above, the camera module 414 also includes an adhesive 440 for securing or bonding the lens barrel relative to the imager PCB during the focus and alignment process. The adhesive 440 may be thermally conductive or non-conductive. For non-conductive adhesive, the camera 414 may or may not have thermal paste or a thermal pad for improved heat transfer.

The camera module 414 thus advantageously utilizes a smaller secondary PCB 460 relative to the imager PCB 424, with the secondary PCB 460 only having electrical components and circuitry for operating the lens heater 404. The secondary PCB 460 only spans part of a cross dimension of the imager PCB and thus does not add to the size of the camera module 414, because the camera module 414 is defined by the size of the imager PCB and the length of the main electrical connector 424*b*. Additionally, the secondary PCB 460 allows for an easy and flexible assembly process for the camera module 414. For example, the heater element 404 can be connected to the secondary PCB 460 independent from the focus and align process, and the secondary PCB 460 can be connected to the imager PCB 424 via the board-to-board connector 462 as a last step before the rear housing portion 430*b* is assembled. The secondary PCB 460 may optionally be removed for cameras without a heater element, while the imager PCB and the rear housing portion 430*a* may remain the same.

In the illustrated embodiments, the imager assembly is part of a camera, where the imager assembly may be disposed at a housing portion and the flexible connector may be electrically connected to another circuit board of the camera (such as a processor circuit board having an image processor and other circuitry disposed thereat), such as by utilizing aspects of the windshield-mounted camera assemblies described in U.S. Pat. Nos. 9,896,039; 9,871,971 and/or 9,596,387, which are all hereby incorporated herein by reference in their entireties. In such an application, the other circuit board may have the electrical connector at one side that is aligned with the connector portion of the rear housing for electrically connecting the camera to a vehicle cable (such as a coaxial cable) or wire harness. Optionally, the imager assembly may be part of an exterior-mounted camera, where a rear housing may be mated with the lens holder after the imager printed circuit board is attached to the lens holder, such as by utilizing aspects of the windshield-mounted camera assemblies described in U.S. Pat. Nos. 10,272,857 and/or 10,264,219, which are hereby incorporated herein by reference in their entireties. Optionally, the camera module may be disposed at the vehicle so as to view interior of the vehicle, such as toward a driver head position, such as for a driver monitoring system or an occupant monitoring system of the vehicle. The camera assembly includes an electrical connector portion that is configured to electrically connect to a vehicle cable or wire harness when the camera is installed at a vehicle.

The printed circuit boards may be attached at the lens holder or to the rear camera housing, and/or may be attached to one another, such as by utilizing aspects of the cameras and processes described in U.S. Publication No. US-2020-0010024, which is hereby incorporated herein by reference in its entirety. The imager is aligned with the lens at the lens holder and the lens is optically aligned and focused with the imager and the housing portions are joined or bonded, such as by utilizing aspects of the cameras and processes described in U.S. Pat. Nos. 10,272,857; 10,264,219; 9,451,138; 9,277,104 and/or 8,542,451, which are hereby incorporated herein by reference in their entireties.

The camera may include electrical connecting elements that accommodate tolerances in the housing and/or PCB mounting and/or connector portion. The electrical connecting elements may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569; US-2016-0037028; US-2016-0268716; US-2017-0133811; US-2017-0295306 and/or US-2017-0302829, which are hereby incorporated herein by reference in their entireties. Optionally, the electrical connections may be established via molded interconnect device (MID) technology, such as by utilizing aspects of the cameras described in U.S. Publication Nos. US-2018-0072239; US-2017-0295306 and/or US-2016-0037028, which are hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2020-0039447; US-2015-0327398; US-2015-0015713; US-2014-0160284; US-2014-0226012 and/or US-2009-0295181, which are all hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels, such as at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The camera assembly or module may utilize aspects of the cameras and connectors described in U.S. Pat. Nos. 10,272,857; 10,250,004; 10,230,875; 10,142,532; 9,621,769; 9,277,104; 9,077,098; 8,994,878; 8,542,451 and/or 7,965,336, and/or U.S. Publication Nos. US-2009-0244361; US-2013-0242099; US-2014-0373345; US-2015-0124098; US-2015-0222795; US-2015-0327398; US-2016-0243987; US-2016-0268716; US-2016-0286103; US-2016-0037028; US-2017-0129419; US-2017-0133811; US-2017-0201661; US-2017-0280034; US-2017-0295306 and/or US-2018-0098033, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera module, the vehicular camera module comprising:
 a camera housing configured for mounting at an in-cabin side of a windshield of a vehicle equipped with the vehicular camera module, the camera housing including a front housing portion and a rear housing portion;
 an imager printed circuit board having a first side and a second side separated from the first side by a thickness of the imager printed circuit board, wherein an imager is disposed at the first side of the imager printed circuit board;
 a lens barrel accommodating a lens, wherein the lens barrel is attached at the front housing portion and extends through an aperture of the front housing portion;
 wherein, with the imager aligned with the lens, the imager printed circuit board is adhesively attached at an inner end of the lens barrel;

a connector printed circuit board comprising an electrical connector configured to electrically connect the vehicular camera module to an electrical connector of the vehicle when the camera housing is mounted at the in-cabin side of the windshield of the vehicle;

wherein the connector printed circuit board is attached at the front housing portion;

wherein, with the lens barrel and the connector printed circuit board attached at the front housing portion, the connector printed circuit board is spaced from the imager printed circuit board and no part of the connector printed circuit board overlaps any part of the imager printed circuit board;

wherein circuitry of the imager printed circuit board is electrically connected to circuitry of the connector printed circuit board via a flexible electrical connector;

wherein the rear housing portion includes a receiving portion configured to receive the electrical connector of the connector printed circuit board when the front housing portion, with the lens barrel and connector printed circuit board attached at the front housing portion, is attached at the rear housing portion during assembly of the vehicular camera module;

wherein, with the lens barrel and the connector printed circuit board attached at the front housing portion, the imager printed circuit board is parallel to the connector printed circuit board; and wherein, with the lens barrel and the connector printed circuit board attached at the front housing portion, the imager printed circuit board and the connector printed circuit board are spaced apart in a direction parallel to a longitudinal axis of the lens barrel.

2. The vehicular camera module of claim 1, wherein the flexible electrical connector comprises a plurality of flexible polyimide layers.

3. The vehicular camera module of claim 1, wherein the flexible electrical connector comprises a flexible ribbon cable.

4. The vehicular camera module of claim 1, wherein the front housing portion includes a chamfered edge region proximate to the lens barrel and corresponding to a rake angle of the windshield to, with the camera housing mounted at the in-cabin side of the windshield, position the lens barrel relative to the windshield of the vehicle.

5. The vehicular camera module of claim 1, wherein the front housing portion includes at least two pins configured to engage a mounting structure at the windshield to limit rotation of the camera housing relative to the windshield of the vehicle when the camera housing is mounted at the in-cabin side of the windshield of the vehicle.

6. The vehicular camera module of claim 1, wherein the lens is threadedly attached to the front housing portion of the camera housing.

7. The vehicular camera module of claim 1, further comprising a thermally conductive element disposed between and contacting the imager printed circuit board and the rear housing portion.

8. The vehicular camera module of claim 1, wherein the electrical connector extends from the connector printed circuit board in a direction perpendicular to a longitudinal axis of the lens barrel.

9. The vehicular camera module of claim 8, wherein, with the camera housing mounted at the in-cabin side of the windshield of the vehicle, the electrical connector extends in a downward direction.

10. The vehicular camera module of claim 1, wherein, with the camera housing mounted at the in-cabin side of the windshield of the vehicle, the connector printed circuit board is laterally offset from the imager printed circuit board toward one side of the vehicle.

11. The vehicular camera module of claim 1, wherein the connector printed circuit board is disposed at and contacts an inner side of the front housing portion.

12. A vehicular camera module, the vehicular camera module comprising:

a camera housing configured for mounting at an in-cabin side of a windshield of a vehicle equipped with the vehicular camera module, the camera housing including a front housing portion and a rear housing portion;

an imager printed circuit board having a first side and a second side separated from the first side by a thickness of the imager printed circuit board, wherein an imager is disposed at the first side of the imager printed circuit board;

a lens barrel accommodating a lens, wherein the lens barrel is attached at the front housing portion and extends through an aperture of the front housing portion;

wherein, with the imager aligned with the lens, the imager printed circuit board is adhesively attached at an inner end of the lens barrel;

a connector printed circuit board comprising an electrical connector configured to electrically connect the vehicular camera module to an electrical connector of the vehicle when the camera housing is mounted at the in-cabin side of the windshield of the vehicle;

wherein the connector printed circuit board is attached at the front housing portion;

wherein, with the lens barrel and the connector printed circuit board attached at the front housing portion, the connector printed circuit board is spaced from the imager printed circuit board and no part of the connector printed circuit board overlaps any part of the imager printed circuit board;

wherein circuitry of the imager printed circuit board is electrically connected to circuitry of the connector printed circuit board via a flexible electrical connector;

wherein the rear housing portion includes a receiving portion configured to receive the electrical connector of the connector printed circuit board when the front housing portion, with the lens barrel and connector printed circuit board attached at the front housing portion, is attached at the rear housing portion during assembly of the vehicular camera module;

wherein, with the lens barrel and the connector printed circuit board attached at the front housing portion, the imager printed circuit board is parallel to the connector printed circuit board; and wherein, with the lens barrel and the connector printed circuit board attached at the front housing portion, the imager printed circuit board and the connector printed circuit board are co-planar.

13. The vehicular camera module of claim 12, wherein the connector printed circuit board is attached at the front housing portion via a plurality of spacing elements.

14. A vehicular camera module, the vehicular camera module comprising:

a camera housing configured for mounting at a vehicle equipped with the vehicular camera module, the camera housing including a front housing portion and a rear housing portion;

an imager printed circuit board having a first side and a second side separated from the first side by a thickness of the imager printed circuit board, wherein an imager is disposed at the first side of the imager printed circuit board;

wherein an electrical connector is disposed at and extends from the second side of the imager printed circuit board, and wherein the electrical connector is configured to electrically connect the vehicular camera module to an electrical connector of the vehicle when the camera housing is mounted at the vehicle;

wherein the front housing portion includes a lens barrel accommodating a lens, wherein the lens barrel extends through an aperture of the front housing portion;

wherein, with the imager aligned with the lens, the imager printed circuit board is adhesively attached at an inner end of the lens barrel;

wherein the lens barrel includes a heating element for heating at least part of the lens, and wherein the heating element includes a flexible electrical connector extending from the inner end of the lens barrel;

a heating element printed circuit board comprising an electrical connector for electrically connecting to the flexible electrical connector of the heating element;

wherein, with the front housing portion attached at the rear housing portion, the electrical connector of the imager printed circuit board extends past the heating element printed circuit board toward a connector portion of the rear housing portion of the camera housing; and wherein the heating element printed circuit board includes a board-to-board connector positioned between the heating element printed circuit board and the imager printed circuit board.

15. The vehicular camera module of claim 14, wherein the electrical connector of the imager printed circuit board electrically connects to the connector portion of the rear housing portion.

16. The vehicular camera module of claim 14, wherein the electrical connector of the imager printed circuit board is positioned at an end region of the imager printed circuit board distal from the board-to-board connector and offset from the heating element printed circuit board.

17. A vehicular camera module, the vehicular camera module comprising:

a camera housing configured for mounting at an in-cabin side of a windshield of a vehicle equipped with the vehicular camera module, the camera housing including a front housing portion and a rear housing portion;

an imager printed circuit board having a first side and a second side separated from the first side by a thickness of the imager printed circuit board, wherein an imager is disposed at the first side of the imager printed circuit board;

a lens barrel accommodating a lens, wherein the lens barrel is attached at the front housing portion and extends through an aperture of the front housing portion;

wherein, with the imager aligned with the lens, the imager printed circuit board is adhesively attached at an inner end of the lens barrel;

a connector printed circuit board comprising an electrical connector configured to electrically connect the vehicular camera module to an electrical connector of the vehicle when the camera housing is mounted at the in-cabin side of the windshield of the vehicle;

wherein the connector printed circuit board is attached at the front housing portion;

wherein, with the lens barrel and the connector printed circuit board attached at the front housing portion, the connector printed circuit board is spaced from the imager printed circuit board and no part of the connector printed circuit board overlaps any part of the imager printed circuit board;

wherein circuitry of the imager printed circuit board is electrically connected to circuitry of the connector printed circuit board via a flexible ribbon cable;

wherein the rear housing portion includes a receiving portion configured to receive the electrical connector of the connector printed circuit board when the front housing portion, with the lens barrel and connector printed circuit board attached at the front housing portion, is attached at the rear housing portion during assembly of the vehicular camera module;

wherein, with the camera housing mounted at the in-cabin side of the windshield of the vehicle, the connector printed circuit board is laterally offset from the imager printed circuit board toward one side of the vehicle;

wherein, with the lens barrel and the connector printed circuit board attached at the front housing portion, the imager printed circuit board is parallel to the connector printed circuit board; and wherein, with the lens barrel and the connector printed circuit board attached at the front housing portion, the imager printed circuit board and the connector printed circuit board are spaced apart in a direction parallel to a longitudinal axis of the lens barrel.

18. The vehicular camera module of claim 17, wherein the electrical connector extends from the connector printed circuit board in a direction perpendicular to a longitudinal axis of the lens barrel.

19. The vehicular camera module of claim 18, wherein, with the camera housing mounted at the in-cabin side of the windshield of the vehicle, the electrical connector extends in a downward direction.

20. The vehicular camera module of claim 17, wherein the connector printed circuit board is disposed at and contacts an inner side of the front housing portion.

21. A vehicular camera module, the vehicular camera module comprising:

a camera housing configured for mounting at an in-cabin side of a windshield of a vehicle equipped with the vehicular camera module, the camera housing including a front housing portion and a rear housing portion;

an imager printed circuit board having a first side and a second side separated from the first side by a thickness of the imager printed circuit board, wherein an imager is disposed at the first side of the imager printed circuit board;

a lens barrel accommodating a lens, wherein the lens barrel is attached at the front housing portion and extends through an aperture of the front housing portion;

wherein, with the imager aligned with the lens, the imager printed circuit board is adhesively attached at an inner end of the lens barrel;

a connector printed circuit board comprising an electrical connector configured to electrically connect the vehicular camera module to an electrical connector of the vehicle when the camera housing is mounted at the in-cabin side of the windshield of the vehicle;

wherein the connector printed circuit board is attached at the front housing portion;

wherein, with the lens barrel and the connector printed circuit board attached at the front housing portion, the connector printed circuit board is spaced from the imager printed circuit board and no part of the connector printed circuit board overlaps any part of the imager printed circuit board;

wherein circuitry of the imager printed circuit board is electrically connected to circuitry of the connector printed circuit board via a flexible ribbon cable;

wherein the rear housing portion includes a receiving portion configured to receive the electrical connector of the connector printed circuit board when the front housing portion, with the lens barrel and connector printed circuit board attached at the front housing portion, is attached at the rear housing portion during assembly of the vehicular camera module;

wherein, with the camera housing mounted at the in-cabin side of the windshield of the vehicle, the connector printed circuit board is laterally offset from the imager printed circuit board toward one side of the vehicle;

wherein, with the lens barrel and the connector printed circuit board attached at the front housing portion, the imager printed circuit board is parallel to the connector printed circuit board; and wherein, with the lens barrel and the connector printed circuit board attached at the front housing portion, the imager printed circuit board and the connector printed circuit board are co-planar.

22. The vehicular camera module of claim 21, wherein the connector printed circuit board is attached at the front housing portion via a plurality of spacing elements.

\* \* \* \* \*